United States Patent
Noh et al.

(10) Patent No.: US 9,801,184 B2
(45) Date of Patent: Oct. 24, 2017

(54) MULTIPLE NETWORK ALLOCATION VECTOR OPERATION

(71) Applicant: NEWRACOM, INC., Irvine, CA (US)

(72) Inventors: Yujin Noh, Irvine, CA (US); Yong Ho Seok, Irvine, CA (US); Dae Won Lee, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 0 days.

(21) Appl. No.: 15/393,084

(22) Filed: Dec. 28, 2016

(65) Prior Publication Data

US 2017/0188376 A1    Jun. 29, 2017

Related U.S. Application Data

(60) Provisional application No. 62/272,033, filed on Dec. 28, 2015, provisional application No. 62/355,252, filed on Jun. 27, 2016, provisional application No. 62/356,445, filed on Jun. 29, 2016, provisional application No. 62/357,855, filed on Jul. 1, 2016.

(51) Int. Cl.
*H04W 72/04* (2009.01)
*H04W 52/42* (2009.01)
*H04W 72/08* (2009.01)
*H04W 24/08* (2009.01)
(Continued)

(52) U.S. Cl.
CPC ......... *H04W 72/046* (2013.01); *H04W 24/08* (2013.01); *H04W 52/42* (2013.01); *H04W 72/0453* (2013.01); *H04W 72/085* (2013.01); *H04W 88/02* (2013.01); *H04W 88/08* (2013.01)

(58) Field of Classification Search
CPC ... H04W 52/42; H04W 72/046; H04W 52/04; H04W 52/16; H04W 52/24; H04W 52/367
See application file for complete search history.

(56) References Cited

U.S. PATENT DOCUMENTS

2005/0129051 A1   6/2005   Zhu et al.
2005/0195786 A1   9/2005   Shpak
(Continued)

OTHER PUBLICATIONS

"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.

(Continued)

*Primary Examiner* — Ashley Shivers

(57) ABSTRACT

A first wireless device may determine a bandwidth for transmitting a frame, calculate two or more Spatial Reuse (SR) parameter values for the bandwidth, set, using the SR parameter values, first and second SR fields of the frame based on the bandwidth and a channel center frequency in which the bandwidth is carried, and transmit the frame to a second wireless device on the bandwidth. The first and second SR fields may be set to a first value when the bandwidth is a 40 MHz bandwidth and the channel center frequency is in a 2.4 GHz band. The first and second SR fields may be set to the first value when the bandwidth is an 80+80 MHz bandwidth and the channel center frequency is in a 5 GHz band. The first value may be a minimum of SR parameter values for first and second bandwidths in the bandwidth.

18 Claims, 15 Drawing Sheets

(51) Int. Cl.
*H04W 88/02* (2009.01)
*H04W 88/08* (2009.01)

(56) References Cited

U.S. PATENT DOCUMENTS

| | | |
|---|---|---|
| 2007/0147226 A1 | 6/2007 | Khandekar et al. |
| 2008/0130541 A1 | 6/2008 | Kokku et al. |
| 2008/0175198 A1 | 7/2008 | Singh et al. |
| 2008/0274766 A1 | 11/2008 | Pratt et al. |
| 2009/0231225 A1 | 9/2009 | Choudhury et al. |
| 2011/0188424 A1 | 8/2011 | Ramamurthy et al. |
| 2013/0070607 A1 | 3/2013 | Sun et al. |
| 2013/0070701 A1 | 3/2013 | Merlin et al. |
| 2014/0307653 A1* | 10/2014 | Liu ................ H04B 7/2612 370/329 |
| 2014/0362840 A1* | 12/2014 | Wong ............... H04W 88/06 370/338 |
| 2016/0164654 A1* | 6/2016 | Huang ............... H04B 7/0452 370/392 |
| 2016/0316468 A1* | 10/2016 | Huang .............. H04W 72/0446 |
| 2017/0041798 A1* | 2/2017 | Li ..................... H04W 16/02 |

OTHER PUBLICATIONS

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11 ac™-2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

International Search Report and Written Opinion for PCT/US2016/069004, dated Mar. 17, 2017.

\* cited by examiner

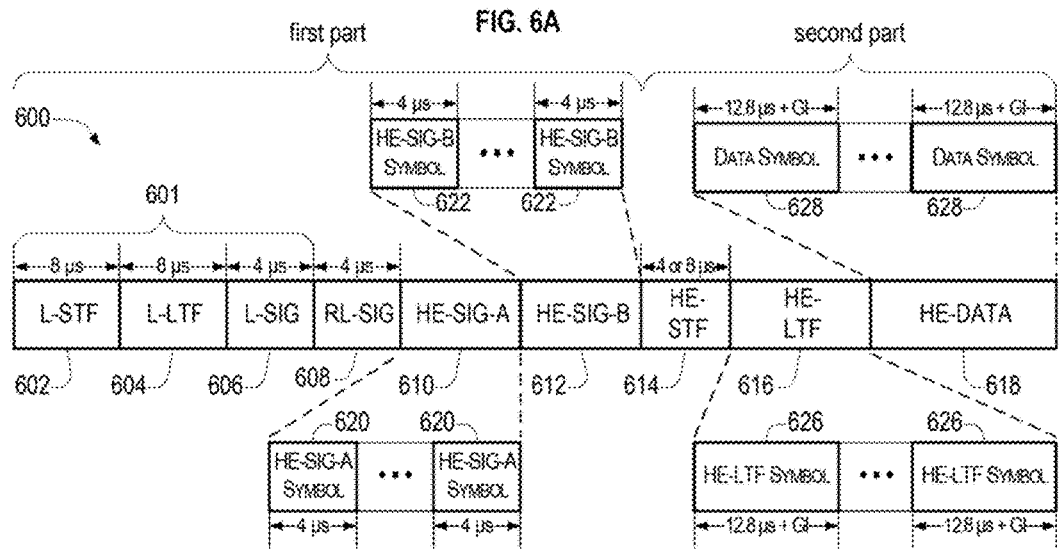

Table 1:

| Element | definition | duration | DFT period | GI | Subcarrier spacing |
|---|---|---|---|---|---|
| Legacy (L)-STF | Non-HT Short Training field | 8 μs | - | - | equiv. to 1,250 kHz |
| L-LTF | Non-HT Long Training field | 8 μs | 3.2 μs | 1.6 μs | 312.5 kHz |
| L-SIG | Non-HT Signal field | 4 μs | 3.2 μs | 0.8 μs | 312.5 kHz |
| RL-SIG | Repeated Non-HT SIGNAL field | 4 μs | 3.2 μs | 0.8 μs | 312.5 kHz |
| HE-SIG-A | HE SIGNAL A field | $N_{HESIGA}$ * 4 μs | 3.2 μs | 0.8 μs | 312.5 kHz |
| HE-SIG-B | HE SIGNAL B field | $N_{HESIGB}$ * 4 μs | 3.2 μs | 0.8 μs | 312.5 kHz |
| HE-STF | HE Short Training field | 4 or 8 μs | - | - | • non-trigger-based PPDU: (equiv. to) 1,250 kHz;<br>• trigger-based PPDU: (equiv. to) 625 kHz |
| HE-LTF | HE Long Training field | $N_{HELTF}$ * (DFT period + GI)μs | 2xLTF: 6.4 μs<br>4xLTF: 12.8 μs | supports 0.8, 1.6, 3.2 μs | • 2xLTF: (equiv. to) 156.25 kHz;<br>• 4xLTF: 78.125 kHz |
| HE-DATA | HE DATA field | $N_{DATA}$ * (DFT period + GI)μs | 12.8 μs | supports 0.8, 1.6, 3.2 μs | 78.125 kHz |

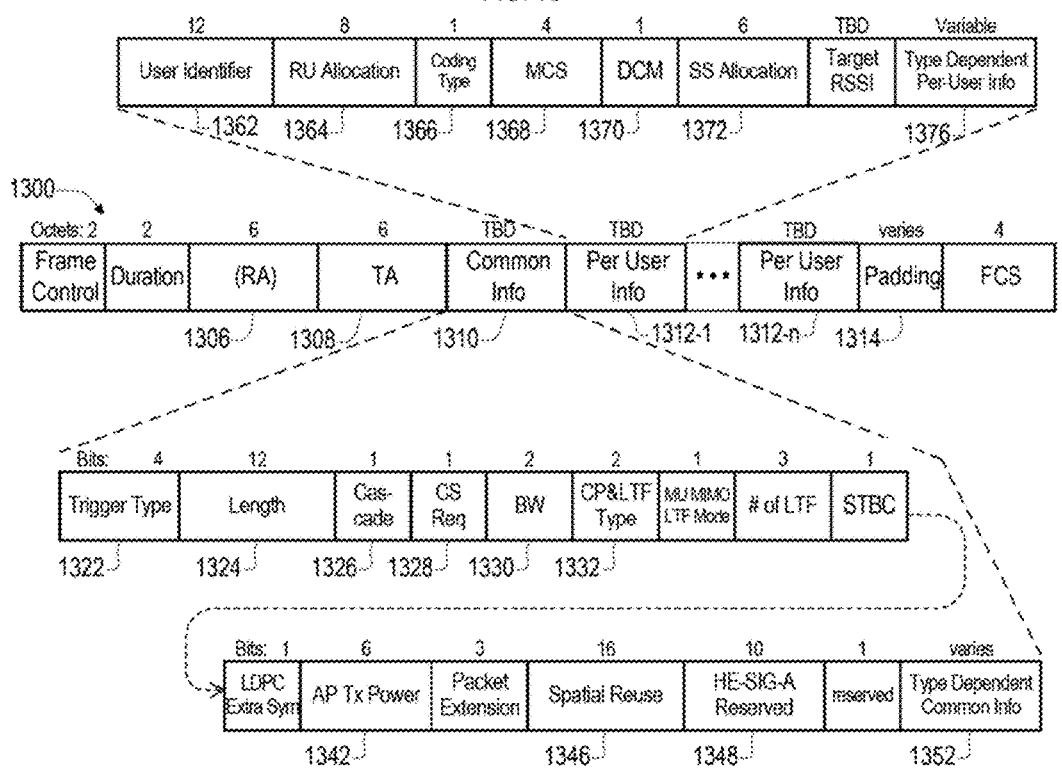

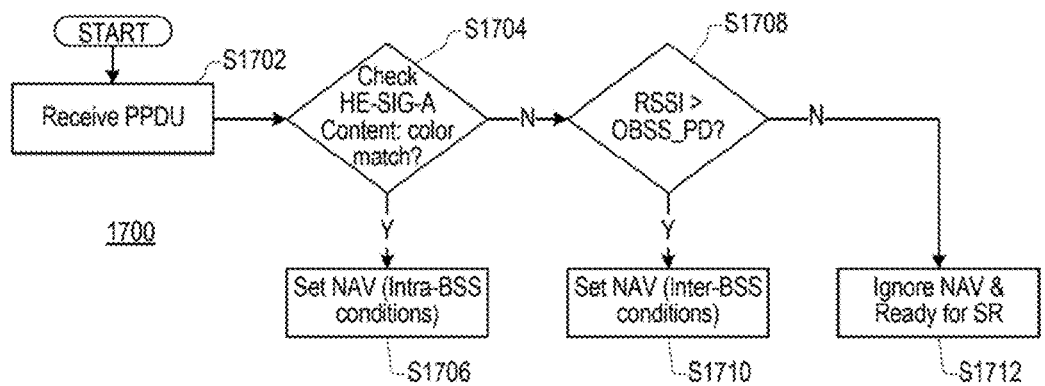
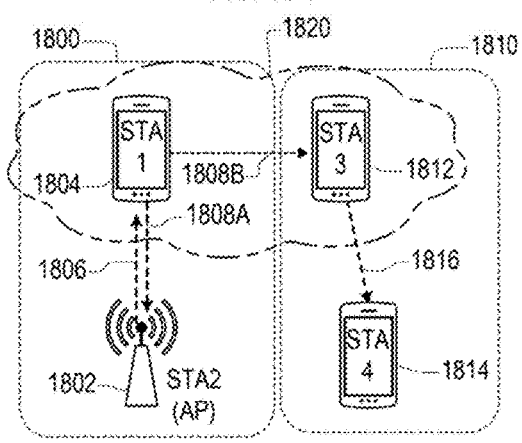
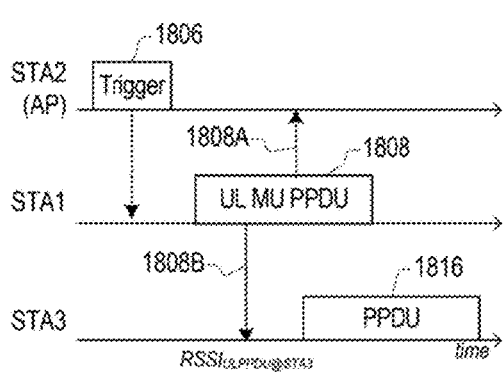
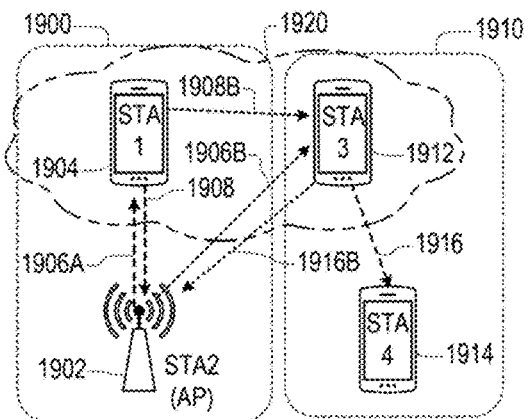
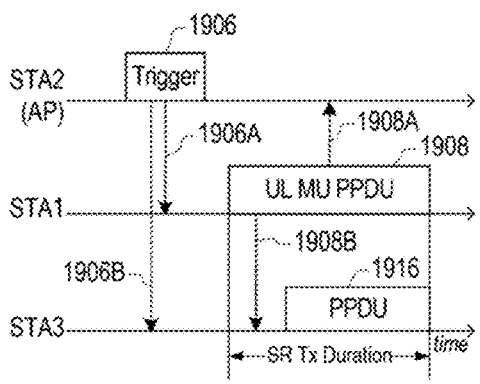

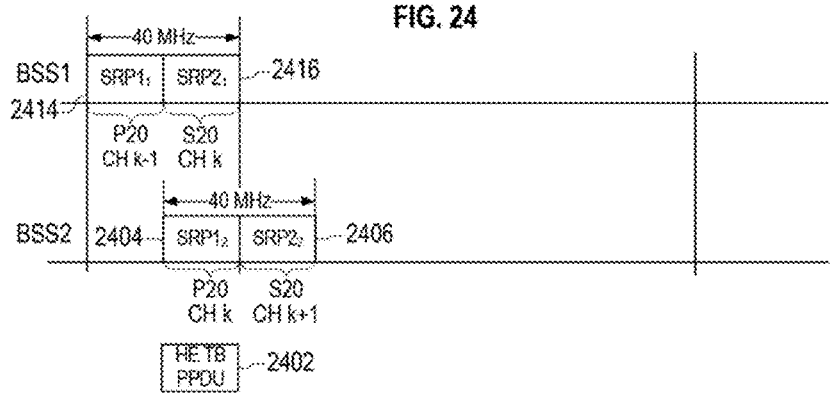
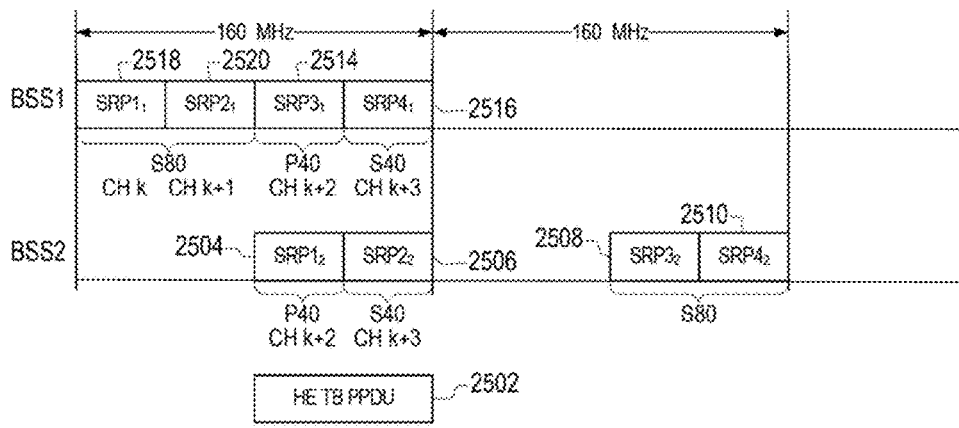

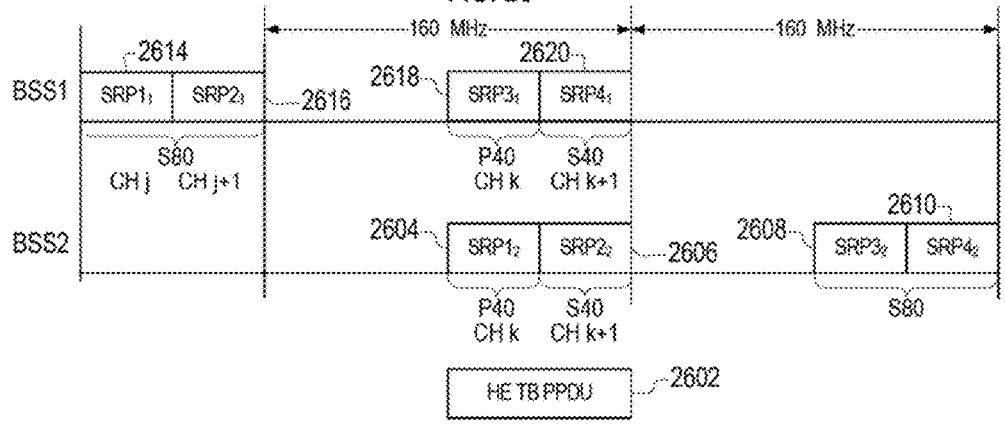

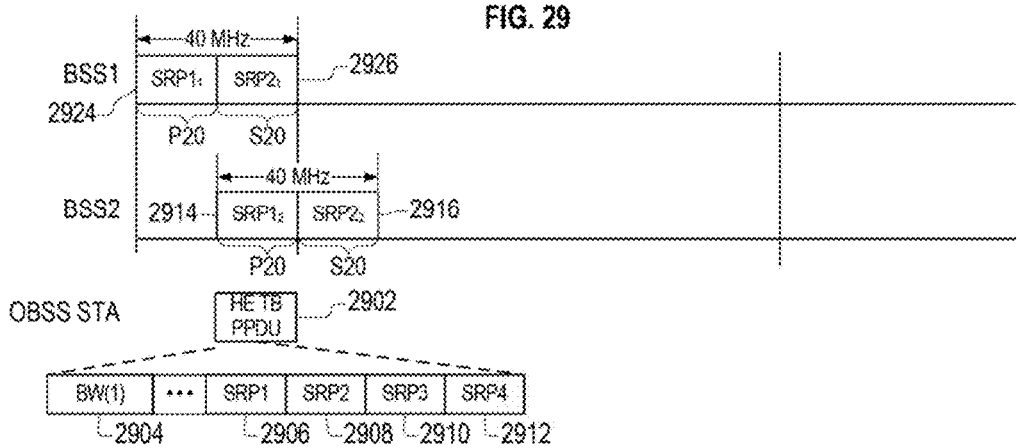

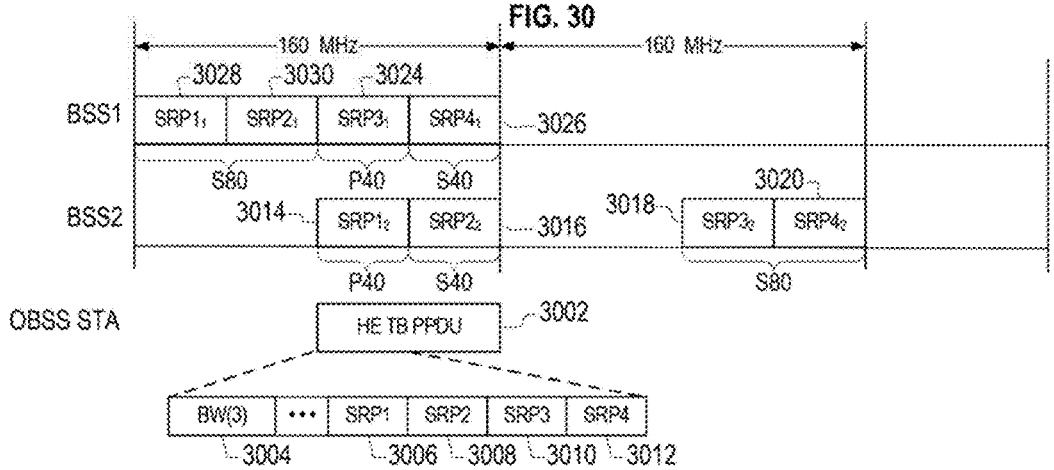

FIG. 31

| | 4 x 4 bits of SR fields of a Trigger frame | | | |
|---|---|---|---|---|
| For 20 MHz | SR field 1 on 1st 20 MHz | SR field 2 on 1st 20 MHz | SR field 3 on 1st 20 MHz | SR field 4 on 1st 20 MHz |
| For 40 MHz | SR field 1 on 1st 20 MHz | SR field 2 on 2nd 20 MHz | SR field 3 (same as SR field 1) | SR field 4 (same as SR field 2) |
| For 40 MHz (2.4 GHz only) | SR field 1 (min of SRP1 and SRP2) | SR field 2 (same as SR field 1) | SR field 3 (same as SR field 1) | SR field 4 (same as SR field 1) |
| For 80 MHz | SR field 1 on 1st 20 MHz | SR field 2 on 2nd 20 MHz | SR field 3 on 3rd 20 MHz | SR field 4 on 4th 20 MHz |
| For 160 MHz | SR field 1 on 1st 40 MHz | SR field 2 on 2nd 40 MHz | SR field 3 on 3rd 40 MHz | SR field 4 on 4th 40 MHz |
| For 80+80 MHz | SR field 1 (min of SRP1 and SRP3) | SR field 2 (min of SRP2 and SRP4) | SR field 3 (same as SR field 1) | SR field 4 (same as SR field 2) |

FIG. 32

| | 4 x 4 bits of SR fields in HE-SIG-A | | | |
|---|---|---|---|---|
| For 20 MHz | SR field 1 on 1st 20 MHz | SR field 2 (same as SR field 1) | SR field 3 (same as SR field 1) | SR field 4 (same as SR field 1) |
| For 40 MHz | SR field 1 on 1st 20 MHz | SR field 2 on 2nd 20 MHz | Channel Number | |

FIG. 33

| | 4 x 4 bits of SR fields in HE-SIG-A | | | |
|---|---|---|---|---|
| For 20 MHz | SR field 1 on 1st 20 MHz | SR field 2 (same as SR field 1) | SR field 3 (same as SR field 1) | SR field 4 (same as SR field 1) |
| For 40 MHz | SR field 1 on 1st 20 MHz | SR field 2 on 2nd 20 MHz | SR field 3 (same as SR field 1) | SR field 4 (same as SR field 2) |
| For 80 MHz | SR field 1 on 1st 20 MHz | SR field 2 on 2nd 20 MHz | SR field 3 on 3rd 20 MHz | SR field 4 on 4th 20 MHz |
| For 160 MHz | SR field 1 on 1st 40 MHz | SR field 2 on 2nd 40 MHz | SR field 3 on 3rd 40 MHz | SR field 4 on 4th 40 MHz |
| For 80+80 MHz | SR field 1 on 1st 40 MHz | SR field 2 on 2nd 40 MHz | Channel Number | |

FIG. 34

| | 4 x 4 bits of SR fields in HE-SIG-A | | | |
|---|---|---|---|---|
| For 20 MHz | SR field 1 on 1st 20 MHz | SR field 2 (same as SR field 1) | SR field 3 (same as SR field 1) | SR field 4 (same as SR field 1) |
| For 40 MHz | SR field 1 on 1st 20 MHz | SR field 2 on 2nd 20 MHz | SR field 3 (same as SR field 1) | SR field 4 (same as SR field 2) |
| For 80 MHz | SR field 1 on 1st 20 MHz | SR field 2 on 2nd 20 MHz | SR field 3 on 3rd 20 MHz | SR field 4 on 4th 20 MHz |
| For 160 MHz | SR field 1 on 1st 20 MHz | SR field 2 on 2nd 40 MHz | SR field 3 on 3rd 40 MHz | SR field 4 on 4th 40 MHz |
| For 80+80 MHz | SR field 1 on 1st 40 MHz | SR field 2 (same as SR field 1) | SR field 3 (same as SR field 1) | SR field 4 (same as SR field 1) |

FIG. 35

| | 4 x 4 bits of SR fields in HE-SIG-A | | | |
|---|---|---|---|---|
| For 20 MHz | SR field 1 on 1st 20 MHz | SR field 2 (same as SR field 1) | SR field 3 (same as SR field 1) | SR field 4 (same as SR field 1) |
| For 40 MHz | SR field 1 on 1st 20 MHz | SR field 2 on 2nd 20 MHz | SR field 3 (same as SR field 1) | SR field 4 (same as SR field 2) |
| For 80 MHz | SR field 1 on 1st 20 MHz | SR field 2 on 2nd 20 MHz | SR field 3 on 3rd 20 MHz | SR field 4 on 4th 20 MHz |
| For 160 MHz | SR field 1 on 1st 20 MHz | SR field 2 on 2nd 40 MHz | SR field 3 on 3rd 40 MHz | SR field 4 on 4th 40 MHz |
| For 80+80 MHz | SR field 1 on 1st 40 MHz | SR field 2 on 2nd 40 MHz | SR field 3 (same as SR field 1) | SR field 4 (same as SR field 2) |

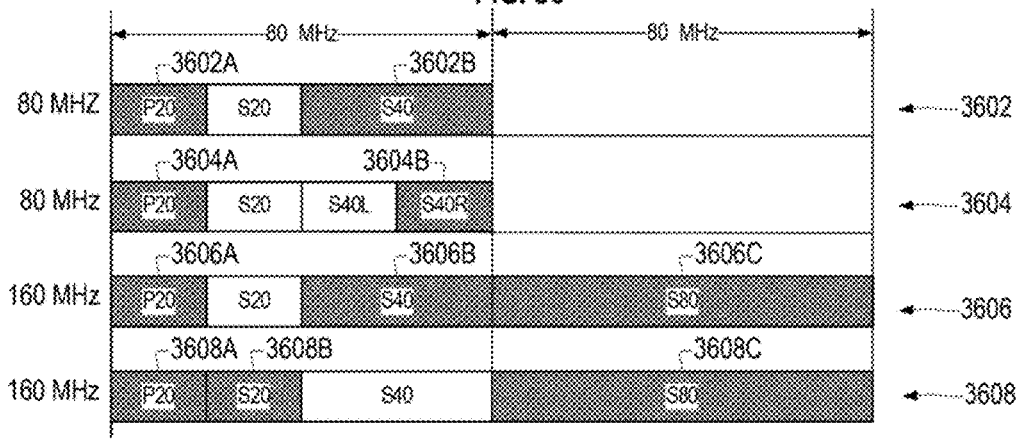
FIG. 36
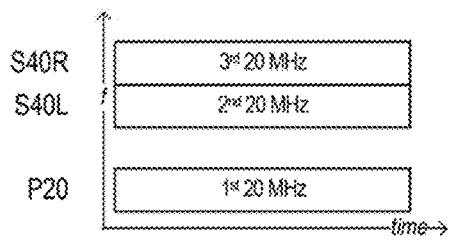
FIG. 37A
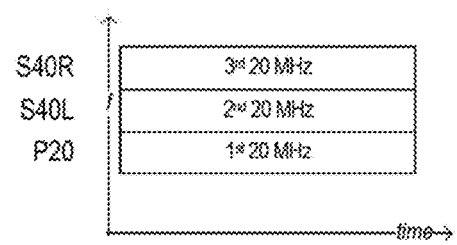
FIG. 37B
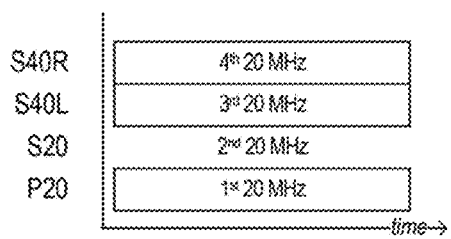
FIG. 38A
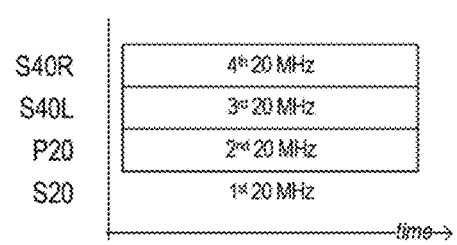
FIG. 38B
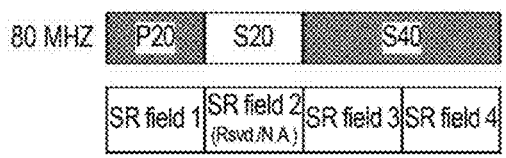
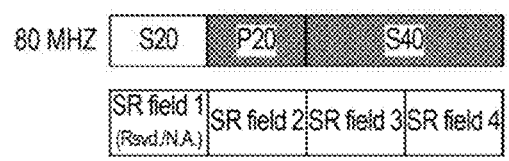

FIG. 39

| | ←—————4 x4 bits of SR fields in HE-SIG-A—————→ | | | | ←—TBD bits—→ | ←—TBD bits—→ |
|---|---|---|---|---|---|---|
| For 20 MHz | SR field 1 on 1st 20 MHz | SR field 2 on 1st 20 MHz | SR field 3 on 1st 20 MHz | SR field 4 on 1st 20 MHz | Frequency Location of 1st 20 MHz | Frequency Location of 2nd 20 MHz |
| For 40 MHz | SR field 1 on 1st 20 MHz | SR field 2 on 2nd 20 MHz | SR field 3 on 1st 20 MHz | SR field 4 on 2nd 20 MHz | Frequency Location of 1st 20 MHz | Frequency Location of 2nd 20 MHz |
| For 80 MHz | SR field 1 on 1st 20 MHz | SR field 2 on 2nd 20 MHz | SR field 3 on 3rd 20 MHz | SR field 4 on 4th 20 MHz | Frequency Location of 1st 20 MHz | Frequency Location of 4th 20 MHz |
| For 160 MHz | SR field 1 on 1st 40 MHz | SR field 2 on 2nd 40 MHz | SR field 3 on 3rd 40 MHz | SR field 4 on 4th 40 MHz | Frequency Location of 1st 40 MHz | Frequency Location of 4th 40 MHz |
| For 80+80 MHz | SR field 1 on 1st 40 MHz | SR field 2 on 2nd 40 MHz | SR field 3 on 3rd 40 MHz | SR field 4 on 4th 40 MHz | Frequency Location of 1st 40 MHz | Frequency Location of 4th 40 MHz |

FIG. 40

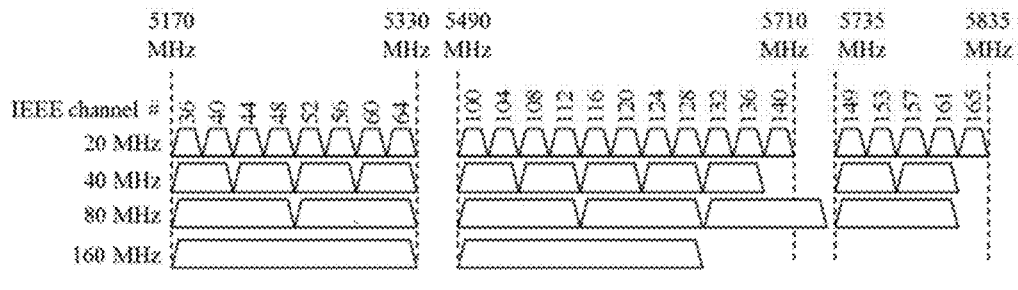

Operating class in the United States

FIG. 41

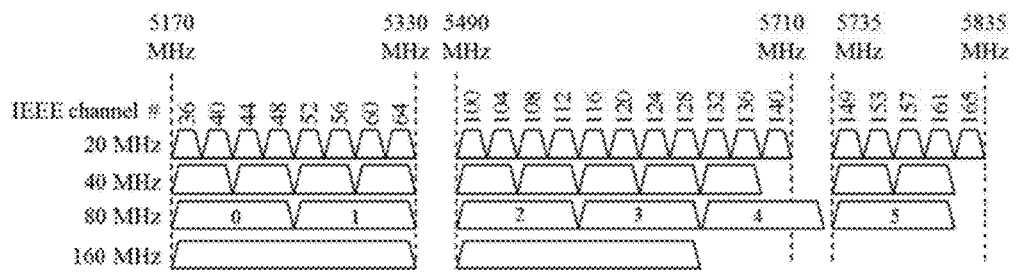

Operating class in the United States

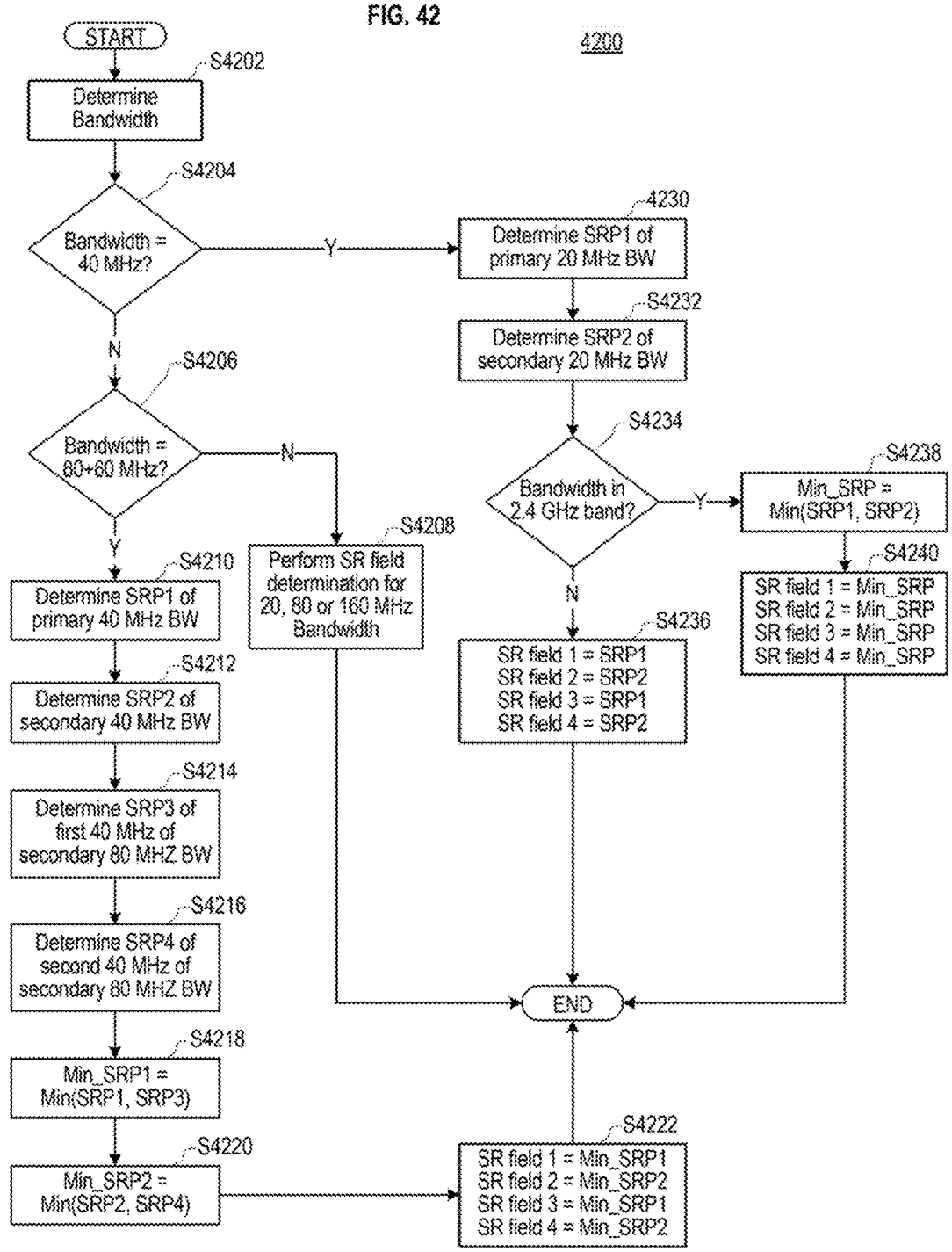

MULTIPLE NETWORK ALLOCATION VECTOR OPERATION

CROSS-REFERENCE TO RELATED APPLICATION

This application claims the benefit of U.S. Provisional Patent Application No. 62/272,033, filed Dec. 28, 2015, U.S. Provisional Patent Application No. 62/355,252 filed Jun. 27, 2016, U.S. Provisional Patent Application No. 62/356,445 filed Jun. 29, 2016, and U.S. Provisional Patent Application No. 62/357,855 filed Jul. 1, 2016, which are incorporated by reference herein in their entireties.

BACKGROUND

1. Technical Field

The technology described herein relates generally to wireless networking. More particularly, the technology relates to efficient use of a shared wireless medium in areas where Wireless Local Area Networks (WLANs) overlap.

2. Description of the Related Art

Wireless LAN (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (IEEE 802.11n). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (IEEE 802.11ac).

Recently, an amendment focused on providing a High Efficiency (HE) WLAN in high-density scenarios is being developed by the IEEE 802.11ax task group. The 802.11ax amendment focuses on improving metrics that reflect user experience, such as average per station throughput, the 5th percentile of per station throughput of a group of stations, and area throughput. Improvements may be made to support environments such as wireless corporate offices, outdoor hotspots, dense residential apartments, and stadiums.

Where WLANs overlap, communications in one WLAN may prevent communications in another WLAN. When this causes WLAN communications to be prevented unnecessarily, system efficiency of the WLANs is decreased.

SUMMARY

In an embodiment, a method is performed by a first wireless device. The method comprises determining, by the first wireless device, a bandwidth on which a frame will be transmitted to a second wireless device, calculating, by the first wireless device, two or more Spatial Reuse (SR) parameter values for the bandwidth, setting, by the first wireless device using the two or more SR parameter values, a first SR field and a second SR field of the frame based on the bandwidth and a channel center frequency in which the bandwidth is carried, and transmitting the frame to the second wireless device on the bandwidth.

In an embodiment, the method further comprises setting the first SR field and the second SR field to a first SR value when the bandwidth is a 40 MHz bandwidth and the channel center frequency is in a 2.4 GHz band.

In an embodiment, the method further comprises setting a third SR field of the frame to the first SR value, and setting a fourth SR field of the frame to the first SR value when the bandwidth is the 40 MHz bandwidth and the channel center frequency is in a 2.4 GHz band.

In an embodiment, calculating the two or more SR parameter values when the bandwidth is the 40 MHz bandwidth and the channel center frequency is in the 2.4 GHz band comprises determining a first SR parameter value for a first 20 MHz in the bandwidth, determining a second SR parameter value for a second 20 MHz in the bandwidth, setting the first SR value to a minimum of the first SR parameter value and the second SR parameter value when the bandwidth is the 40 MHz bandwidth and the channel center frequency is in the 2.4 GHz band.

In an embodiment, the method further comprises setting the first SR field to the first SR value when the bandwidth is an 80+80 MHz bandwidth and the channel center frequency is in a 5 GHz band, and setting the second SR field to the second SR value when the bandwidth is an 80+80 MHz bandwidth and the channel center frequency is in the 5 GHz band.

In an embodiment, the method further comprises setting a third SR field of the frame to the first SR value when the bandwidth is the 80+80 MHz bandwidth and the channel center frequency is in the 5 GHz band, setting a fourth SR field of the frame to the second SR value when the bandwidth is the 80+80 MHz bandwidth and the channel center frequency is in the 5 GHz band.

In an embodiment, calculating the two or more SR parameter values when the bandwidth is the 80+80 MHz bandwidth and the channel center frequency is in a 5 GHz band comprises determining a first SR parameter value, in the two or more SR parameter values, for a first 40 MHz of the bandwidth, determining a second SR parameter value, in the two or more SR parameter values, for a second 40 MHz of the bandwidth, determining a third SR parameter value, in the two or more SR parameter values, for a third 40 MHz of the bandwidth, determining a fourth SR parameter value, in the two or more SR parameter values, for a fourth 40 MHz of the bandwidth, setting the first SR value to a minimum of the first SR parameter value and the third SR parameter value when the bandwidth is the 80+80 MHz bandwidth and the channel center frequency is in the 5 GHz band, and setting the second SR value to a minimum of the second SR parameter value and the fourth SR parameter value when the bandwidth is the 80+80 MHz bandwidth and the channel center frequency is in the 5 GHz band.

In an embodiment, the first SR field has a length of four bits and the second SR field has a length of four bits.

In an embodiment, the frame is a Trigger frame.

In an embodiment, a method is performed by a wireless device. The method comprises determining, by the wireless device, an operational bandwidth of a frame to be transmitted, calculating, by the wireless device, a plurality of Spatial Reuse (SR) parameter values for the operational bandwidth, and setting, by the wireless device using the plurality of SR parameters, first and second fields of a frame according to the operational bandwidth and a channel center frequency.

The first and second fields including information for use in a Spatial Reuse (SR) operation. The method further comprises transmitting the frame using the channel center frequency and on the operational bandwidth.

In an embodiment, the frame is a Trigger frame, and the operational bandwidth is an operational bandwidth of a Physical Protocol Data Unit (PPDU) transmitted in response to the Trigger frame.

In an embodiment, the method further comprises setting the first field and the second field to a first value when the operational bandwidth is a 40 MHz bandwidth and the channel center frequency is in a 2.4 GHz band.

In an embodiment, the method further comprises setting a third field of the frame to the first value, the third field including information for use in the SR operation, and setting a fourth field of the frame to the first value when the bandwidth is a 40 MHz bandwidth and the channel center frequency is in the 2.4 GHz band, the fourth field includes information for use in the SR operation.

In an embodiment, calculating the plurality of SR parameter values comprises determining a first SR parameter value of the plurality of SR parameter values for a first 20 MHz bandwidth, determining a second SR parameter value of the plurality of SR parameter values for a second 20 MHz bandwidth, and setting the first value to a minimum of the first SR parameter value and the second SR parameter value when the bandwidth is the 40 MHz bandwidth and the channel center frequency is in the 2.4 GHz band.

In an embodiment, the method further comprises setting the first field to a first value when the bandwidth is an 80+80 MHz bandwidth and the channel center frequency is in a 5 GHz band; and setting the second field to a second value when the bandwidth is the 80+80 MHz bandwidth and the channel center frequency is in the 5 GHz band.

In an embodiment, the method further comprises setting a third field of the frame to the first value, and setting a fourth field of the frame to the second value when the bandwidth is the 80+80 MHz bandwidth and the channel center frequency is in the 5 GHz band.

In an embodiment, calculating the plurality of Spatial Reuse (SR) parameter values comprises determining a first SR parameter value of the plurality of SR parameter values for a first 40 MHz bandwidth of the operational bandwidth, determining a second SR parameter value of the plurality of SR parameter values for a second 40 MHz bandwidth of the operational bandwidth, determining a third SR parameter value of the plurality of SR parameter values for a third 40 MHz bandwidth of the operational bandwidth, determining a fourth SR parameter value of the plurality of SR parameter values for a fourth 40 MHz bandwidth of the operational bandwidth, setting the first value to a minimum of the first SR parameter and the third SR parameter when the bandwidth is the 80+80 MHz bandwidth and the channel center frequency is in the 5 GHz band, and setting the second value to a minimum of the second SR parameter and the fourth SR parameter when the bandwidth is the 80+80 MHz bandwidth and the channel center frequency is in the 5 GHz band.

In an embodiment, the first field has a length of four bits and the second field has a length of four bits.

In an embodiment, the first field corresponds to a signal power and the second field corresponds to a signal power.

In an embodiment, a first wireless device comprises one or more processors and a transmitter circuit. The first wireless device determines, using the one or more processors, a bandwidth on which a frame will be transmitted to a second wireless device, calculates, using the one or more processors, two or more Spatial Reuse (SR) parameter values for the bandwidth, sets, using the one or more processors and the two or more SR parameter values, a first SR field and a second SR field of the frame based on the bandwidth and a channel center frequency on which the bandwidth is carried, and transmits, using the transmitter circuit, the frame to the second wireless device on the bandwidth.

BRIEF DESCRIPTION OF THE DRAWINGS

FIG. 6A illustrates a HE PHY Protocol Data Units (PPDU), according to an embodiment.

FIG. 6B shows a Table 1 disclosing additional properties of fields of the HE PPDU frame of FIG. 6A, according to an embodiment.

FIG. 13 illustrates a frame format for a Trigger frame suitable for use in a High Efficiency (HE) WLAN, according to an embodiment.

FIG. 14 includes a Table 2 showing values of a Cyclic Prefix (CP) and Long Training Field (LTF) field of a Trigger frame, according to an embodiment.

FIG. 15 includes a Table 3 showing values of a Trigger type field of a Trigger frame, according to an embodiment.

FIG. 16 includes a Table 4 showing values of 7-bit indices of a Resource Unit (RU) Allocation field of a Trigger frame, according to an embodiment.

FIG. 17 illustrates a process for determining whether to perform an SR transmission based on an OBSS_PD threshold level, according to an embodiment.

FIGS. 18A and 18B illustrate an SR transmission, according to an embodiment.

FIGS. 19A and 19B illustrate an operation of an Opportunistic Adaptive Clear Channel Assessment (OA-CCA) mechanism, according to an embodiment.

FIG. 23 illustrates fields in an HE-SIG-A field related to Spatial Reuse, according to an embodiment.

FIG. 24 illustrates an example of SR operation in a 2.4 GHz band, according to an embodiment.

FIG. 25 illustrates another example of SR operation in a 5 GHz band, according to an embodiment.

FIG. 26 illustrates another example of SR operation in a 5 GHz band, according to an embodiment.

FIG. 27 illustrates values of SR fields within an HE-SIG-A field of an UL Trigger-based PPDU, according to an embodiment.

FIG. 28 illustrates the SR values used for SR transmissions, according to an embodiment.

FIG. 29 illustrates aspects of OA_CCA for a 40 MHz transmission having a channel center frequency in a 2.4 GHz band, according to an embodiment.

FIG. 30 illustrates aspects of OA_CCA for an 80+80 MHz transmission on a channel center frequency in a 5 GHz band, according to an embodiment.

FIG. 31 illustrates SR field values of a Trigger frame, according to another embodiment.

FIG. 32 illustrates SR fields and an optional channel information field of an HE-SIG-A field for transmissions in a 2.4 GHz band, according to an embodiment.

FIG. 33 illustrates SR fields and an optional channel information field of an HE-SIG-A field for transmissions in a 5 GHz band, according to another embodiment.

FIG. 34 illustrates SR fields of an HE-SIG-A field for transmissions in a 5 GHz band, according to another embodiment.

FIG. 35 illustrates SR fields of an HE-SIG-A field for transmissions in a 5 GHz band, according to another embodiment.

FIG. 36 illustrates a set of allowed channel bondings which may include the most useful cases which are most likely to occur, according to an embodiment.

FIGS. 37A and 37B show examples of numberings of 20 MHz bandwidths in discontinuous 60 MHz channels, according to an embodiment.

FIGS. 38A and 38B show examples of numberings of 20 MHz bandwidths in discontinuous 60 MHz channels, according to another embodiment.

FIG. 39 illustrates fields in an HE-SIG-A field related to Spatial Reuse, according to an embodiment.

FIG. 40 illustrates 80 MHz channelizations of a 5 GHz band as defined in the United State.

FIG. 41 illustrates a numbering of 80 MHz channelization of a 5 GHz band as defined in the United State, according to an embodiment.

FIG. 42 illustrates a process for determining SR fields of a Trigger frame, according to an embodiment.

DETAILED DESCRIPTION

Figure 1:
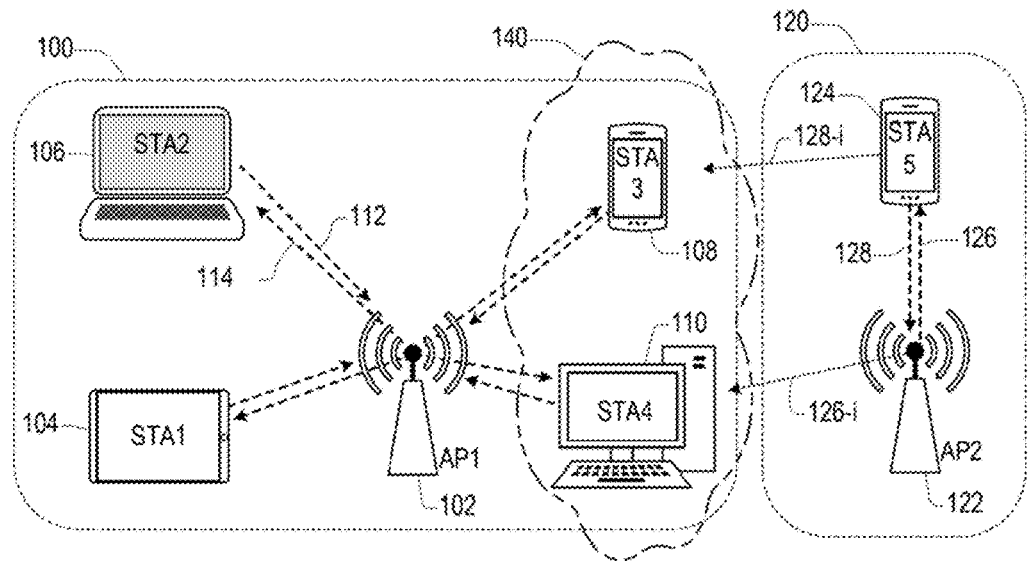
FIG. 1 illustrates wireless networks, according to an embodiment.

The technology described herein relates generally to wireless networking. More particularly, the technology relates to improving the efficiency of a WLAN in situations where a plurality of Basic Service Sets (BSSs) have overlapping coverage areas (that is, where a plurality of BSSs overlap), and in particular when one or more stations are in the Overlapping BSS (OBSS) area.

In the following detailed description, certain illustrative embodiments have been illustrated and described. As those skilled in the art would realize, these embodiments are capable of modification in various different ways without departing from the scope of the present disclosure. Accordingly, the drawings and description are to be regarded as illustrative in nature and not restrictive. Like reference numerals designate like elements in the specification.

FIG. 1 illustrates wireless networks according to an embodiment. The wireless networks includes first and second infrastructure Basic Service Sets (BSSs) 100 and 120 of Wireless Local Area Networks (WLANs). In an 802.11 WLAN, the BSS provides the basic organizational unit and typically includes an Access Point (AP) and one or more associated stations (STAs).

The first BSS 100 includes a first Access Point 102 (also referred to as AP1) wirelessly communicating with first, second, third, and fourth wireless devices (or stations) 104, 106, 108, and 110 (also referred to as stations STA1, STA2, STA3, and STA4, respectively). The second BSS 120 includes a second AP 122 (also referred to as AP2) and a fifth device (or station) 124 (also referred to as station STA5). The wireless devices may each include a medium access control (MAC) layer and a physical (PHY) layer according to an IEEE 802.11 standard.

Although FIG. 1 shows the first BSS 100 including only the first to fourth stations STA1 to STA4 and the second BSS 120 including only the fifth station STA5, embodiments are not limited thereto and may comprise BSSs including any number of stations.

The first AP 102 is a station, that is, a STA, configured to control and coordinate functions of the BSS 100. The first AP 102 may transmit information to a single station selected from the plurality of stations STA1 to STA4 in the first BSS 100 using a single frame, or may simultaneously transmit information to two or more of the stations STA1 to STA4 in the first BSS 100 using either a single Orthogonal Frequency Division Multiplexing (OFDM) broadcast frame, a single OFDM Multi-User Multi-Input-Multi-Output (MU-MIMO) transmission, a single Orthogonal Frequency Division Multiple Access (OFDMA) frame, or a single MU-MIMO OFDMA frame.

The stations STA1 to STA4 may each transmit data to the first AP 102 using a single frame, or transmit information to and receive information from each other using a single frame. Two or more of the stations STA1 to STA4 may simultaneously transmit data to the first AP 102 using an Uplink (UL) OFDMA frame, an UL MU-MIMO frame, or an UL MU-MIMO OFDMA frame.

In another embodiment, the first AP 102 may be absent and the stations STA1 to STA4 may be in an ad-hoc network.

The second AP 122 is a station configured to control and coordinate functions of the second BSS 120. The second AP 122 may transmit information to the fifth station STA5 in the second BSS 120 using a single frame, or may simultaneously transmit information to two or more stations (not shown) of the second BSS 120 using either a single OFDM broadcast frame, a single OFDM MU-MIMO transmission, a single OFDMA frame, or a single MU-MIMO OFDMA frame.

The fifth station STA5 may transmit data to the second AP 122 using a single frame. Two or more of the stations (not shown) of the second BSS 120 may simultaneously transmit data to the second AP 122 using an Uplink (UL) OFDMA frame, an UL MU-MIMO frame, or an UL MU-MIMO OFDMA frame.

FIG. 1 shows a first intra-BSS Down-Link (DL) transmission 114 and a first intra-BSS Up-Link (UL) transmission 112 of the first BSS 100, and shows a second intra-BSS DL transmission 126 and a second intra-BSS UL transmission 128 of the second BSS 120. Intra-BSS transmissions are transmissions between an AP and stations associated with the BSS that the AP controls or between two stations associated with the same BSS.

FIG. 1 also shows first and second inter-BSS transmissions 128-i and 126-i. Inter-BSS transmissions are transmissions transmitted by an AP or station of one BSS and received/detected by an AP or station of another BSS. Here, the first inter-BSS transmission 128-i is an interfering transmission, received by but not targeted/addressed to the third station STA3 associated with the first BSS 100, that was produced as a result of the transmission of the second intra-BSS UL transmission 128 by the fifth station STA5 associated with the second BSS 120. The second inter-BSS transmission 126-i is an interfering transmission, received by but not targeted/addressed to the fourth station STA4 associated with the first BSS 100, that was produced as a result of the transmission of the second intra-BSS DL transmission 126 by the second AP 122 that controls the second BSS 120.

The third and fourth stations STA3 and STA4 are located in an Overlapping BSS (OBSS) area 140 of the first and second BSSs 100 and 120. Stations in the OBSS area 140 may receive transmission from both devices associated with the first BSS 100 and devices associated with the second BSS 120. Transmissions of the stations in the OBSS area 140 may also interfere with transmissions of both the first BSS 100 and the second BSS 120 under some circumstances.

Each of the stations STA1 to STA5 and the APs 102 and 122 includes a processor and a transceiver, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium.

The transceiver represents a unit functionally connected to the processor, and designed to transmit and receive a frame through the wireless network. The transceiver may include a single component that performs the functions of transmitting and receiving, or two separate components each performing one of such functions.

The processor and transceiver of the stations STA1 to STA5, the first AP 102, and the second AP 122 may be respectively implemented using hardware components, software components, or both.

The first and second APs 102 and 122 may each be or include a WLAN router, a stand-alone Access Point, a WLAN bridge, a Light-Weight Access Point (LWAP) managed by a WLAN controller, and the like. In addition, a device such as a personal computer, tablet computer, or cellular phone may configured to be able to operate as the first or second APs 102 or 122, such as when a cellular phone is configured to operate as a wireless "hot spot."

Each of the stations STA1 to STA5 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but embodiments are not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

A type and subtype of a frame may be identified using a type field and/or a subtype field included in a control field of the frame, as prescribed in the applicable standard.

Figure 2:
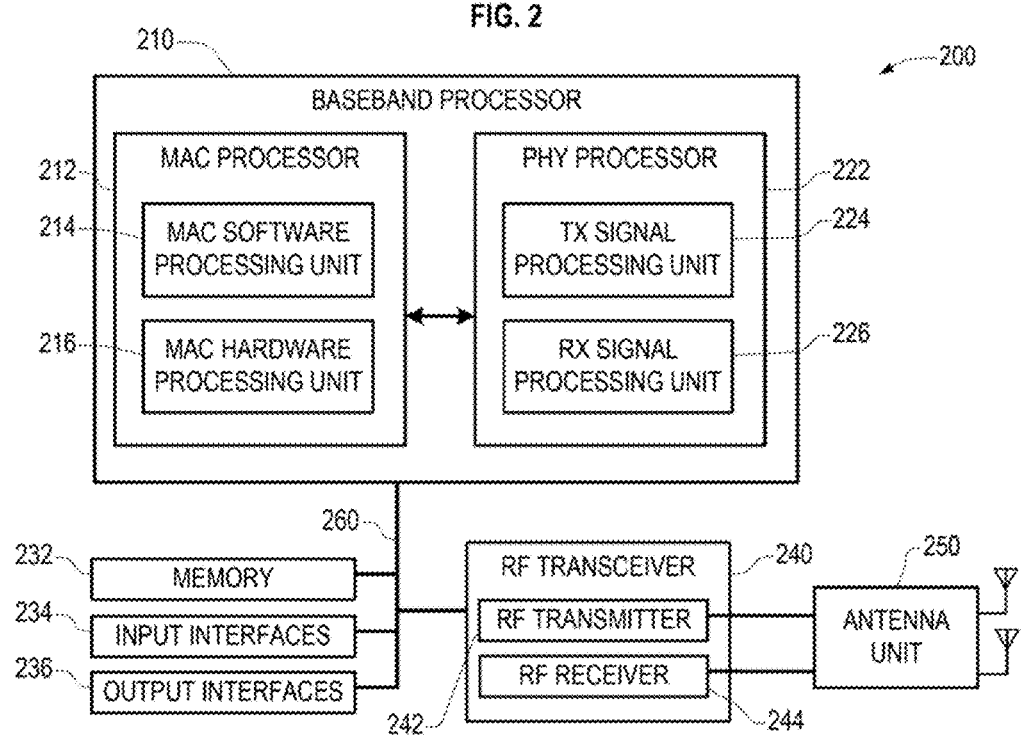
FIG. 2 is a schematic diagram of a wireless device, according to an embodiment.

FIG. 2 illustrates a schematic block diagram of a wireless device 200 according to an embodiment. The wireless or WLAN device 200 may be included in the APs 102 or 122 or any of the stations STA1 to STA5 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the memory 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the memory 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit (SPU) 224 and a receiving SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3A:
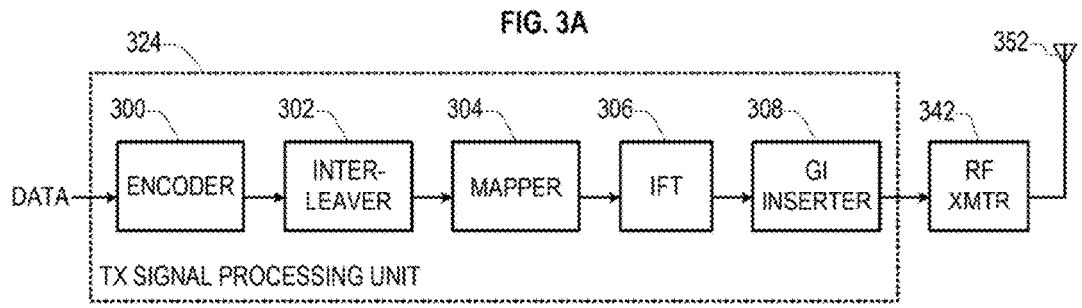
FIG. 3A illustrates components of a wireless device configured to transmit data, according to an embodiment.

FIG. 3A illustrates components of a wireless device configured to transmit data according to an embodiment, including a Transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data DATA. In an embodiment, the encoder 300 includes a forward error correction (FEC) encoder. The FEC encoder may include a binary convolutional code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
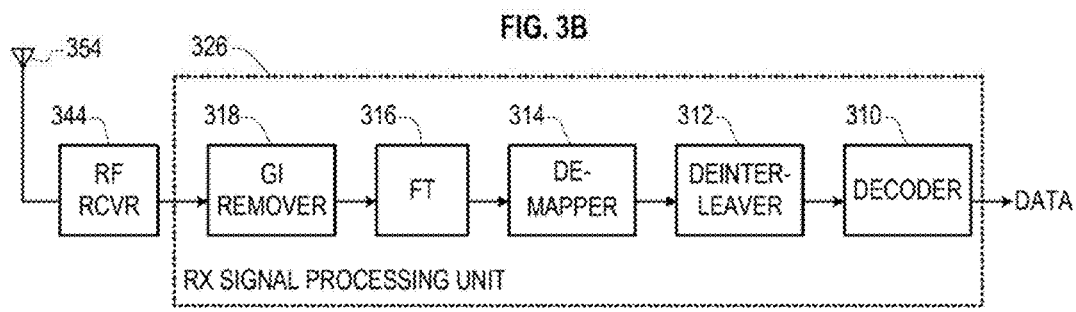
FIG. 3B illustrates components of a wireless device configured to receive data, according to an embodiment.

FIG. 3B illustrates components of a wireless device configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 200 will assess the availability of the wireless medium using Clear Channel Assessment (CCA). If the medium is occupied, CCA may determine that it is busy, while if the medium is available, CCA determines that it is idle.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving Physical Layer Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs.

Figure 4:
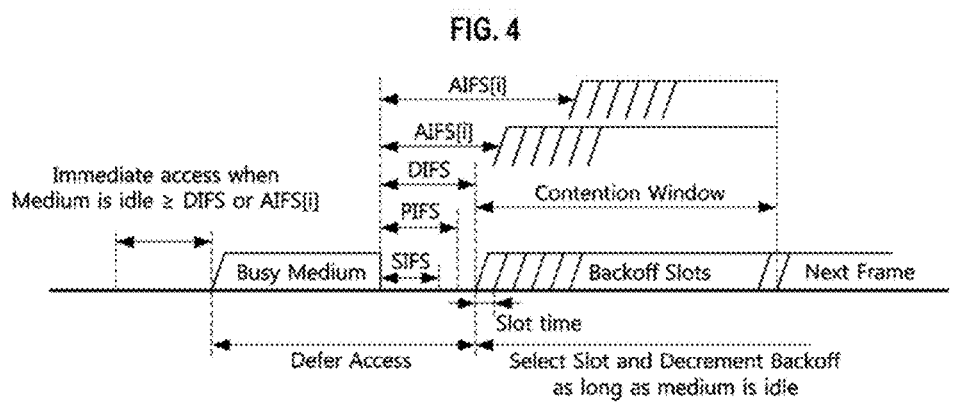
FIG. 4 illustrates Inter-Frame Space (IFS) relationships.

FIG. 4 illustrates Inter-Frame Space (IFS) relationships. FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time.

A data frame is used for transmission of data forwarded to a higher layer. The WLAN device transmits the data frame after performing backoff if a DIFS has elapsed during which DIFS the medium has been idle.

A management frame is used for exchanging management information, which is not forwarded to the higher layer. Subtype frames of the management frame include a beacon frame, an association request/response frame, a probe request/response frame, and an authentication request/response frame.

A control frame is used for controlling access to the medium. Subtype frames of the control frame include a request to send (RTS) frame, a clear to send (CTS) frame, and an acknowledgement (ACK) frame.

When the control frame is not a response frame of another frame, the WLAN device transmits the control frame after performing backoff if a DIFS has elapsed during which DIFS the medium has been idle. When the control frame is the response frame of another frame, the WLAN device transmits the control frame after a SIFS has elapsed without performing backoff or checking whether the medium is idle.

A WLAN device that supports a Quality of Service (QoS) functionality (that is, a QoS station) may transmit the frame after performing backoff if an AIFS for an associated access category (AC), (AIFS[AC]), has elapsed. When transmitted by the QoS station, any of the data frame, the management frame, and the control frame which is not the response frame may use the AIFS[AC] of the AC of the transmitted frame.

A WLAN device may perform a backoff procedure when the WLAN device that is ready to transfer a frame finds the medium busy. In addition, a WLAN device operating according to the IEEE 802.11n and 802.11ac standards may perform the backoff procedure when the WLAN device infers that a transmission of a frame by the WLAN device has failed.

The backoff procedure includes determining a random backoff time composed of N backoff slots, each backoff slot having a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device detects no medium activity for the duration of a particular backoff slot, the backoff procedure shall decrement the backoff time by the slot time. When the WLAN determines that the medium is busy during a backoff slot, the backoff procedure is suspended until the medium is again determined to be idle for the duration of a DIFS or EIFS period. The WLAN device may perform transmission or retransmission of the frame when the backoff timer reaches zero.

The backoff procedure operates so that when multiple WLAN devices are deferring and execute the backoff procedure, each WLAN device may select a backoff time using a random function, and the WLAN device selecting the smallest backoff time may win the contention, reducing the probability of a collision.

Figure 5:
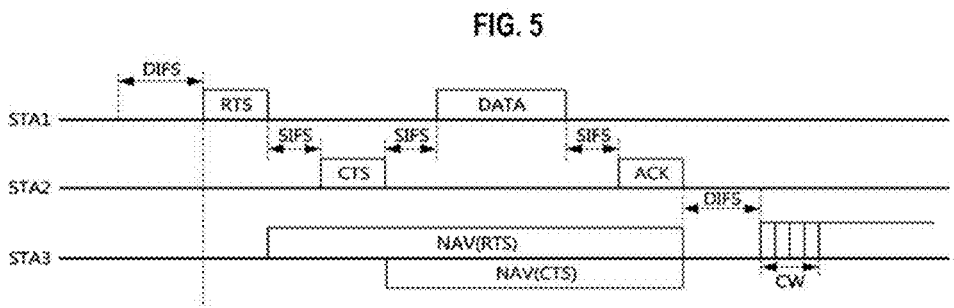
FIG. 5 illustrates a Carrier Sense Multiple Access/Collision Avoidance (CSMA/CA) based frame transmission procedure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1, a frame transmitted from the second station STA2, or both can be received. The stations STA1, STA2, and STA3 may be WLAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the STA1 may transmit a Ready-To-Send (RTS) frame to the second station STA2. Upon receiving the RTS frame, after a SIFS the second station STA2 may transmit a Clear-To-Send (CTS) frame as a response of the RTS frame. If Dual-CTS is enabled and the second station STA2 is an AP, the AP may send two CTS frames in response to the RTS frame: a first CTS frame in the legacy non-HT format, and a second CTS frame in the HT format.

When the third station STA3 receives the RTS frame, it may set a NAV timer of the third station STA3 for a transmission duration of subsequently transmitted frames (for example, a duration of SIFS+CTS frame duration+ SIFS+data frame duration+SIFS+ACK frame duration) using duration information included in the RTS frame. When the third station STA3 receives the CTS frame, it may set the NAV timer of the third station STA3 for a transmission duration of subsequently transmitted frames using duration information included in the CTS frame. Upon receiving a new frame before the NAV timer expires, the third station STA3 may update the NAV timer of the third station STA3 by using duration information included in the new frame. The third station STA3 does not attempt to access the channel until the NAV timer expires.

When the STA1 receives the CTS frame from the second station STA2, it may transmit a data frame to the second station STA2 after SIFS elapses from a time when the CTS frame has been completely received. Upon successfully receiving the data frame, the second station STA2 may transmit an ACK frame as a response of the data frame after SIFS elapses.

When the NAV timer expires, the third station STA3 may determine whether the channel is busy using the carrier sensing. Upon determining that the channel is not used by other devices during a DIFS after the NAV timer has expired, the third station STA3 may attempt to access the channel after a contention window according to a backoff process elapses.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame.

FIG. 5 shows the second station STA2 transmitting an ACK frame to acknowledge the successful reception of a frame by the recipient.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving PHY Protocol Data Units (PPDUs) that are compliant with the mandatory PHY specifications.

A PHY entity may provide support for 20 MHz, 40 MHz, 80 MHz, and 160 MHz contiguous channel widths and support for an 80+80 MHz non-contiguous channel width. Each channel includes a plurality of subcarriers, which may also be referred to as tones.

A PHY entity may define fields denoted as Legacy Signal (L-SIG), Signal A (SIG-A), and Signal B (SIG-B) within which some necessary information about PHY Service Data Unit (PSDU) attributes are communicated. For example, a High Efficiency (HE) PHY entity may define an L-SIG field, an HE-SIG-A field, and an HE-SIG-B field.

The descriptions below, for sake of completeness and brevity, refer to OFDM-based 802.11 technology. Unless otherwise indicated, a station refers to a non-AP HE STA, and an AP refers to an HE AP.

In the IEEE Std 802.11ac, SIG-A and SIG-B fields are called VHT SIG-A and VHT SIG-B fields. Hereinafter, IEEE Std 802.11ax SIG-A and SIG-B fields are respectively referred to as HE-SIG-A and HE-SIG-B fields.

FIG. 6A illustrates an HE PPDU 600 according to an embodiment. A transmitting station generates the HE PPDU frame 600 and transmits it to one or more receiving stations. The receiving stations receive, detect, and process the HE PPDU frame 600.

The HE PPDU frame 600 includes a Legacy Short Training Field (L-STF) field 602, a Legacy (i.e., a Non-High Throughput (Non-HT)) Long Training Field (L-LTF) 604, a Legacy Signal (L-SIG) field 606, which together comprise a legacy preamble 601 and a Repeated L-SIG field (RL-SIG) 608. The L-STF 604 of the HE PPDU has a periodicity of 0.8 µs with 10 periods.

The HE PPDU frame 600 also includes an HE-SIG-A field 610, an optional HE-SIG-B field 612, an HE-STF 614, an HE-LTF 616, and an HE-Data field 618.

The legacy preamble 601, the RL-SIG field 608, the HE-SIG-A field 610, and the HE-SIG-B field 612 when present, comprise a first part of the HE PPDU frame 600. In an embodiment, the first part of the HE PPDU frame 600 is decoded using a 64-element Discrete Fourier Transform (DFT), having a basic subcarrier spacing of 312.5 KHz.

The HE-SIG-A field 610 is duplicated on each 20 MHz segment after the legacy preamble to indicate common control information. The HE-SIG-A field 610 includes a plurality of OFDM HE-SIG-A symbols 620 each having a duration (including a Guard Interval (GI)) of 4 µs. A number of the HE-SIG-A symbols 620 in the HE-SIG-A field 610 is determined as either 2 or 4 depending on a type of the HE PPDU 600.

The HE-SIG-B field 612 is included in Multi-User (MU) PPDU(s). The HE-SIG-B field 612 includes a plurality of OFDM HE-SIG-B symbols 622 each having a duration including a Guard Interval (GI) of 4 µs. In embodiments, Single User (SU) PPDUs, Tigger-based PPDUs, or both do not include the HE-SIG-B field 612. A number of the HE-SIG-B symbols 622 in the HE-SIG-B field 612 is indicated by $N_{HESIGB}$ in HE-SIG-A and is variable.

When the HE PPDU 600 has a bandwidth of 40 MHz or more, the HE-SIG-B field 612 may be transmitted in first and second HE-SIG-B channels 1 and 2. The HE-SIG-B field in the HE-SIG-B channel 1 is referred to as the HE-SIG-B1 field, and the HE-SIG-B field in the HE-SIG-B channel 2 is referred to as the HE-SIG-B2 field. The HE-SIG-B1 field and the HE-SIG-B2 field are communicated using different 20 MHz bandwidths of the HE PPDU 600, and may contain different information. Within this document, the term "HE-SIG-B field" may refer to an HE-SIG-B field of a 20 MHz PPDU, or to either or both of an HE-SIG-B1 field or HE-SIG-B2 field of a 40 MHz or more PPDU.

An HE-STF 614 of a non-trigger-based PPDU has a periodicity of 0.8 µs with 5 periods. A non-trigger-based PPDU is a PPDU that is not sent in response to a trigger frame. An HE-STF 614 of a trigger-based PPDU has a periodicity of 1.6 µs with 5 periods. Trigger-based PPDUs include UL PPDUs sent in response to respective trigger frames.

The HE-LTF 616 includes one or more OFDM HE-LTF symbols 626 each having a duration of 12.8 µs plus a Guard Interval (GI). The HE PPDU frame 600 may support a 2×LTF mode and a 4×LTF mode. In the 2×LTF mode, an HE-LTF symbol 626 excluding a Guard Interval (GI) is equivalent to modulating every other tone in an OFDM symbol of 12.8 µs excluding the GI, and then removing the second half of the OFDM symbol in a time domain. A number of the HE-LTF symbols 626 in the HE-LTF field 616 is indicated by $N_{HELTF}$, and is equal to 1, 2, 4, 6, or 8.

The HE-Data field 618 includes one or more OFDM HE-Data symbols 628 each having a duration of 12.8 µs plus a Guard Interval (GI). A number of the HE-Data symbols 628 in the HE-Data field 618 is indicated by $N_{DATA}$ and is variable.

FIG. 6B shows a Table 1 indicating additional properties of the fields of the HE PPDU frame 600 of FIG. 6A, according to an embodiment.

The descriptions below, for sake of completeness and brevity, refer to OFDMA-based 802.11 technology. Unless otherwise indicated, a station refers to a non-AP HE STA, and an AP refers to an HE AP.

Embodiments include a station of an HE WLAN system, wherein the station maintains two NAV values. The station maintain an Intra-BSS NAV $NAV_{intra-Bss}$ managed according to frames that are identified as intra-BSS frames, and an Inter-BSS NAV $NAV_{inter-BSS}$ managed according to frames that are identified as inter-BSS frames or that cannot be determined to be intra-BSS or inter-BSS frames.

The Inter-BSS NAV $NAV_{inter-BSS}$ may on occasion be controlled by an intra-BSS frame that cannot be identified as an intra-BSS frame, and as a result there may be some unintended procedures that cause the HE WLAN to operate less efficiently than otherwise would be the case.

The distributed nature of channel access network such as IEEE 802.11 WLANs makes the carrier sense mechanism important for reducing a number of collision occurring in the WLAN. The physical carrier sense of one STA is responsible for detecting the transmissions of other STAs. But it may be impossible to detect every single case in some circumstance. For example, a first STA that is a distance away from a second STA may see the medium as idle even though the second STA (known as the "hidden node") is transmitting to an AP, and as a result the first STA may begin transmitting to the AP. The transmissions of the first and second STAs may then collide at the AP, causing one or both transmissions to fail.

A NAV (Network Allocation Vector) is used in the IEEE 802.11 standards to overcome this "hidden node" problem by providing a "virtual carrier sense" capability. However, as the IEEE 802.11 standard evolves to include multiple users' simultaneous transmission/reception scheduled within a BSS (such as UL/DL multi-user (MU) transmission performed in a cascaded manner), it may be advantageous to use a modified or newly defined mechanism for virtual carrier sense.

As used herein, an MU transmission refers to transmissions in which multiple frames are transmitted to or from multiple STAs simultaneously using different resources. Examples of different resources include different frequency resources in an OFDMA transmission and different spatial streams in an MU MIMO transmission. DL OFDMA transmissions, DL MU-MIMO transmissions, UL OFDMA transmissions, and UL MU-MIMO transmissions are examples of MU transmissions.

As used herein, a transmission or frame is targeted to a station when the transmission or frame includes, in a receiver address field, a receiver address of the station.

As used herein, a 2.4 GHz band may be an IEEE Std 802.11 2.4 GHz band/channel center frequency, including frequencies between 2.4 and 2.5 GHz. A frequency or channel being "2.4 GHz" or "in 2.4 GHz" may refer to the frequency or channel being in the 2.4 band.

As used herein, a 5 GHz band may be an IEEE Std 802.11 5 GHz band/channel center frequency including frequencies between 5 and 5.3 GHz. A frequency or channel being "5 GHz" or "in 5 GHz" may refer to the frequency or channel being in the 5 GHz band.

IEEE 802.11ax supports features such as new CCA levels and deferral rules to improve overlapping BSS (OBSS) operation in dense environments. A station determines, using a BSS Color field in an HE-SIG-A field or a MAC address in a MAC header, whether a detected frame is an inter-BSS frame (i.e. a frame transmitted by a device in a different BSS than the one the station is associated with) or an intra-BSS frame (i.e. a frame transmitted by a device in a same BSS as the one the station is associated with).

When the detected frame is an inter-BSS frame, under specific condition, the CCA uses an OBSS_PD threshold that is greater than the minimum receive sensitivity level to determine whether the medium is busy. When an inter-BSS PPDU is received and has a signal level below the OBSS_PD threshold, and no other CCA indication indicates a BUSY channel, then the station determines that the medium is available for use.

Based on percentage of time within a measurement window that the AP sensed the medium was busy by physical CCA or by NAV, the AP may broadcast a BSS Load element in a beacon frame or Probe frame to indicate the current station population and traffic levels of the BSS controlled by the AP. Using this information, stations can determine to associate with the AP broadcasting a low percentage of channel utilization. Depending on the definition of the medium as busy in 11ax with a Spatial Reuse (SR) mechanism, legacy stations may suffer a performance loss because of misleading load information from APs.

In an HE WLAN being developed by the IEEE 802.11 Task Group ax standardization body, more aggressive channel access is being provided for. The more aggressive channel access is provided by increasing a CCA threshold value to increase system throughput. However, increasing the CCA threshold value may result in more frequent packet collisions and degradation of a Quality of Service (QoS) of packet delivery. This is particularly true if a first station assesses a wireless medium and detects a frame that occupies the wireless medium from or to a second station within the same BSS that the first station is associated with (that is, if the medium is occupied by an intra-BSS frame relative to the first station). In this case, even if the CCA threshold value is increased and the first station initiates a transmission to an AP of the BSS, the transmission will not be successful because the AP is currently in the middle of transmission or reception with other stations (e.g., the second station). Accordingly, a modified CCA threshold value does not alter throughput relative to intra-BSS communications. However, this is not the case when the medium is occupied by an inter-BSS frame.

In light of this, CCA related information or spatial reuse related information may be indicated in the physical layer header of a frame such that any station that identifies a start of a frame can utilize this information in deciding whether to adjust a CCA threshold value. For example, the station may determine a CCA threshold to use according to whether information in a frame indicates the frame is an inter-BSS frame or an intra-BSS frame.

An example of an indication of spatial reuse information in a physical layer header is a Color field of a frame. The Color field is a (partial) BSS identifier/information of a transmitter that the frame was transmitted by. When a station identifies a start of a frame when assessing a wireless medium, the station may check the Color field of the frame. If the Color field information is the same with the Color of the station (indicating that the transmitter of the frame has a high probability of being associated with the same BSS as the station) the station assesses the wireless medium as BUSY. However, if the Color field information is different from the Color of the station, the station compares the received signal strength with a first threshold (e.g., an Overlapped BSS Packet Detection (OBSS_PD) threshold), and assesses the wireless medium as BUSY only if the received signal strength is above the first threshold.

Figure 7:
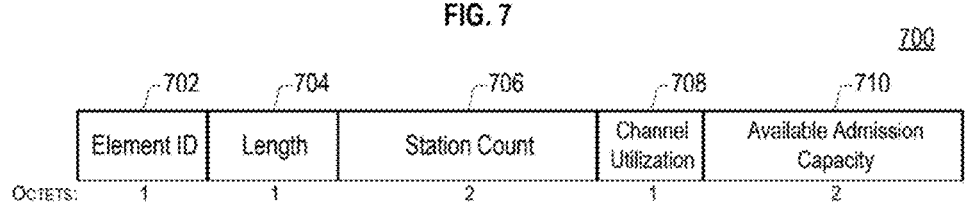
FIG. 7 illustrates a Basic Service Set (BSS) Load element, according to an embodiment.

FIG. 7 illustrates a BSS Load element 700, according to an embodiment. In order to assist a station in an OBSS area in determining which BSS to associate with, an AP may transmit the BSS Load element 700 in a Beacon frame or a Probe frame. The BSS Load element 700 indicates the current station population and traffic levels of its BSS.

The BSS Load element 700 includes an Element Identifier (ID) 702 occupying one octet and having a value of eleven, a Length field 704 occupying one octet and having a value of five, a Station Count field 706 occupying two octets, a Channel Utilization field 708 occupying 1 octet, and an Available Admission Capacity field 710 occupying two octets.

The Station Count 706 has a value interpreted as an unsigned integer that indicates the total number of stations currently associated with the BSS.

The Channel Utilization field is defined as the percentage of time, linearly scaled with 255 representing 100%, that the AP sensed the medium was busy, as indicated by either the physical or virtual carrier sense (CS) mechanism, and determined as described below.

The Available Admission Capacity field 710 corresponds to remaining amount of medium time available via explicit admission control.

Figure 8:
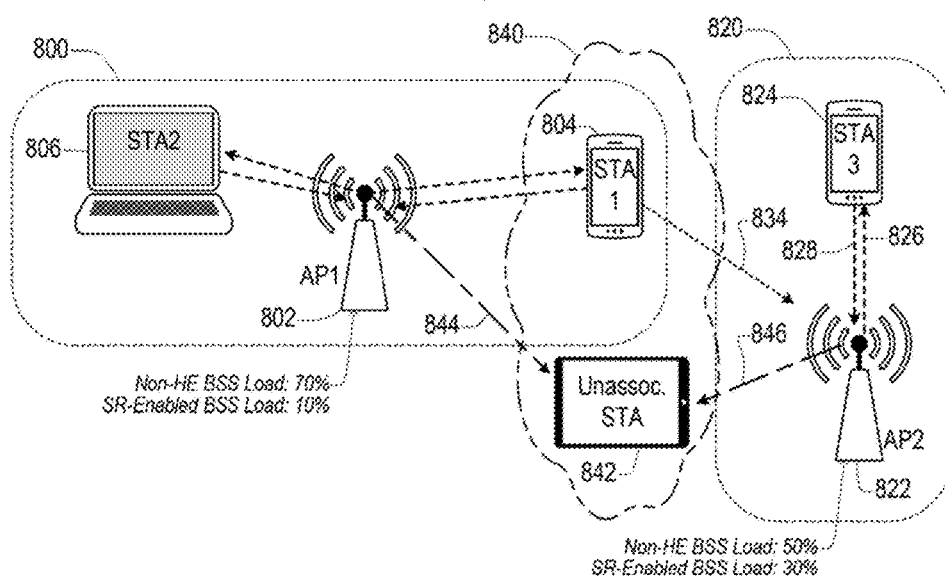
FIG. 8 illustrates an unassociated station in an Overlapping Basic Service Set (OBSS) area where two WLANs overlap, according to an embodiment.

FIG. 8 illustrates an unassociated station 842 in an OBSS area 840. FIG. 8 includes a first BSS 800 and a second BSS 820. The first BSS 800 includes a first AP 802 (AP1), a first station 804 (STA1), and a second station 806 (STA2). The second BSS 820 includes a second AP 822 (AP2) and a third station 824 (STA3).

The first station STA1 and the unassociated station 842 are both located in the OBSS area 840. Stations in the OBSS area 840 can receive transmissions from both the first AP AP1 and the second AP AP2, and can send transmissions to both the first AP AP1 and the second AP AP2. Stations in the OBSS area 840 share the medium.

The first AP AP1 transmits a first Beacon or Probe frame 844, including a first BSS Load element, that is received by the unassociated station 842. The second AP AP2 transmits a second Beacon or Probe frame 846, including a second BSS Load element, that is received by the unassociated station 842.

If a value of the first BSS Load element is less than a value of the second BSS load element, the unassociated station 842 may determine that association with the first AP AP1 will give better throughput for the unassociated station 842 than association with the second AP AP2 would.

Embodiments relate to how a Channel Utilization field value of a BSS Load element should be calculated in the presence of inter-BSS transmissions, such as how the second AP AP2 of FIG. 8 calculates the value of the Channel Utilization field of the second BSS Load Element when the second AP AP2 receives one or more inter-BSS frame 834 from the first station STA1, as well as transmitting one or more intra-BSS frame 826 to the third station STA3 and receiving one or more intra-BSS frames 828 from the third station STA3. Given the new Spatial Reuse (SR) mechanism that is intend to increase system throughput by providing more aggressive channel access, especially in an OBSS area, channel busy time (and therefore Channel Utilization) may be different depending on how it is measured.

Figure 9:
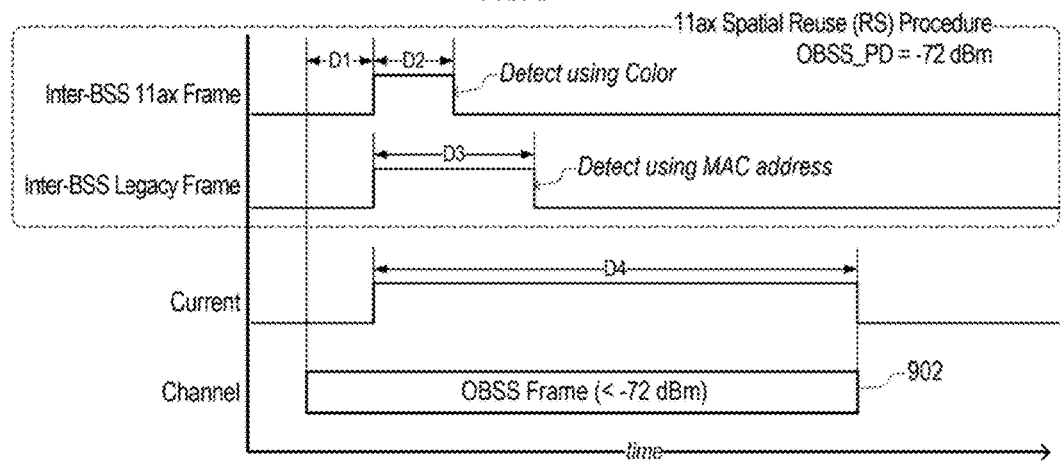
FIG. 9 illustrates a measurement of a channel busy time of an inter-BSS frame according to an embodiment.

FIG. 9 illustrates a measurement of a channel busy time of an inter-BSS frame 902 according to an embodiment. In the embodiment, an OBSS Packet Detection (OBSS_PD) threshold is −72 dBm, whereas a legacy packet detection threshold may be, for example, −79 dBm or −82 dBm. In the example, the inter-BSS frame 902 has a received signal strength between the OBSS_PD threshold and the legacy threshold and is identifiable as an inter-BSS frame by an HE device.

After an initial packet detection delay D1 (such as 4 μsec), a non-HE device would sense the inter-BSS frame 902 as occupying the channel for the duration D4, corresponding to a remaining duration of the inter-BSS frame 902 after the packet detection delay D1. The non-HE device is not able to distinguish between intra-BSS and inter-BSS frames.

An HE device using an SR procedure would identify the inter-BSS frame 902 as an inter-BSS frame after a second duration D2 when the inter-BSS frame 902 is an HE frame including a Color field. The HE device using the SR procedure would identify the inter-BSS frame 902 as an inter-BSS frame after a third duration D3 when the inter-BSS frame 902 is an Legacy frame having a MAC address that does not correspond to a device associated with the BSS of the device receiving the inter-BSS frame 902. Because the inter-BSS frame 902 has a received signal strength less than the OBSS_PD threshold, the HE device using an SR procedure sees its medium as occupying the channel for only the second or third durations D2 or D3.

Because the non-HE device sees the inter-BSS frame 902 as occupying the channel for the longer duration D4, the non-HE device has fewer opportunities to use the channel in the presence of the inter-BSS frame 902 than an the HE device using the SR procedure.

As a result, if the second AP AP2 of FIG. 8 uses the second and third durations D2 and D3 of the SR procedure, whichever duration is applicable, to determine an SR-enabled channel busy time, the channel busy time determined by the second AP AP2 will be less than a channel busy time determined by a non-HE station under the same circumstances.

For example, the second AP AP2 may determine an SR-enabled channel busy time of 30% under circumstances where a non-HE device determines a channel busy time of 50%. At the same time, the first AP AP1 may determine an SR-enabled channel busy time of 10% under circumstances where a non-HE device determines a channel busy time of 70%. These illustrative channel busy times may be due to transmissions involving devices in the OBSS area 840 that are not shown in FIG. 8.

In an embodiment wherein the first and second APs AP1 and AP2 report their respective SR-enabled channel busy times as the BSS Load element Channel Utilization value, the unassociated station 842 in FIG. 8 will receive BSS Load element Channel Utilization values corresponding to 10% and 30%, respectively, from the first and second APs AP1 and AP2.

The unassociated station 842 may then determine to associate with the first AP AP1. However, when the unassociated station 842 is a non-HE station, the unassociated station 842 can expect to see a 70% busy channel upon associating with the first AP AP1, instead of the 50% busy channel the unassociated non-HE station 842 would have seen if it had associated with the second AP AP2. As a result, the performance of the unassociated station 842 may be decreased by its choice of which AP to associate with when the unassociated station 842 is a non-HE device, which is unfair to non-HE devices.

In an embodiment, an additional Channel Utilization field considering the SR mechanism (SR Channel Utilization) is broadcast in addition to the (legacy) Channel Utilization field. In an embodiment, the SR Channel Utilization is indicated in a new BSS Load element. Non-HE devices would use the value in the (legacy) Channel Utilization field, and HE devices would use the value in the SR Channel Utilization field.

For example, in FIG. 8 the first AP AP1 would broadcast a first BSS Load element indicating a Channel Utilization of 70% and also broadcast a first SR enabled BSS Load element indicating an SR Channel Utilization of 10%. The second AP AP2 would broadcast a second BSS Load element indicating a Channel Utilization of 50% and also broadcast a second SR enabled BSS Load element indicating a Channel Utilization of 30%. As a result, HE stations may determine to associate with the first AP AP1 but legacy (non-HE) stations may determine to associate with the second AP AP2.

However, it may require undesirable cost or complexity for an AP to sense both the legacy and the SR-enabled medium states together within a measurement window.

In another embodiment, the percentage of time indicated in the Channel Utilization field corresponds to a percentage of time that the AP sensed the medium as busy within the measurement window based on only SR enabled capability with either physical or virtual carrier sense. SR enabled capability means the AP senses the medium as busy by following the mechanism of SR defined in 11ax.

Figure 10:
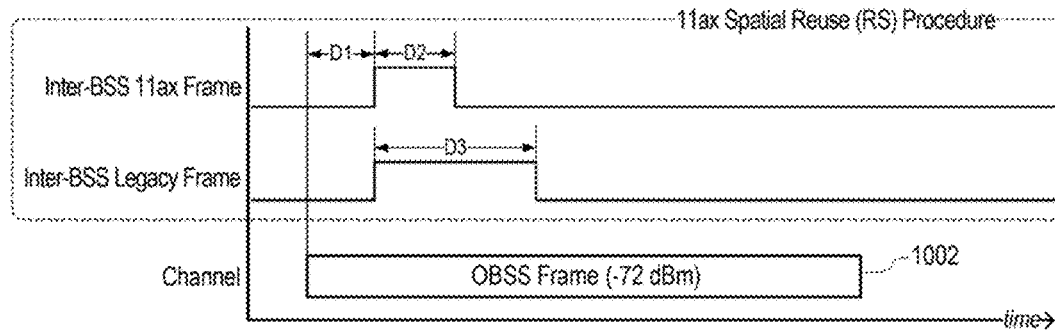
FIG. 10 illustrates sensing the medium as busy based on only Spatial Reuse (SR) enabled capability, according to an embodiment.

FIG. 10 illustrates sensing the medium as busy based on only the SR enabled capability. After an initial packet detection delay D1 (such as 4 μsec), an HE device using an SR procedure would identify the inter-BSS frame 1002 as an inter-BSS frame after a second duration D2 when the inter-BSS frame 1002 is an HE frame including a Color field. The HE device using the SR procedure would identify the inter-BSS frame 1002 as an inter-BSS frame after a third duration D3 when the inter-BSS frame 1002 is an Legacy frame having a MAC address that does not correspond to a device associated with the BSS of the device receiving the inter-BSS frame 1002. Because the inter-BSS frame 1002 has a received signal strength less than the OBSS_PD threshold, the HE device using an SR procedure sees its medium as occupying the channel for only the second or third durations D2 or D3.

Because this Channel Utilization field in BSS Load element is newly designed to give proper information only for 11ax STAs, legacy Channel Utilization could be opted out from Beacon frame and Probe frame such that legacy STAs are not allowed to refer to the Channel Utilization information before determining to associate with the AP which should provide better throughput.

In another embodiment, the percentage of time indicated in the Channel Utilization field corresponds to a percentage of time that the AP sensed the medium as busy within the measurement window based on only SR disabled capability with either physical or virtual carrier sense. SR disabled capability means the AP senses the medium as busy as if SR mechanism is not allowed to measure the medium.

Figure 11:
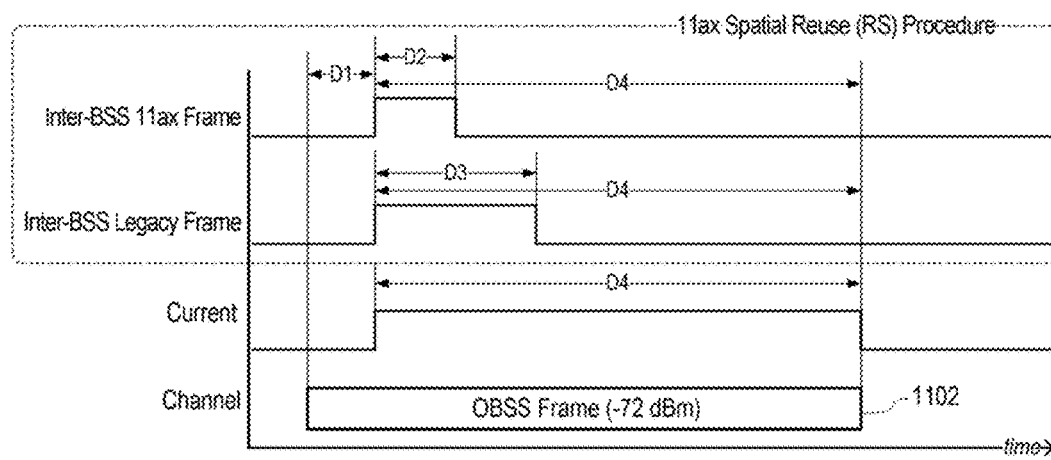
FIG. 11 illustrates sensing the medium as busy based on only SR disabled capability, according to an embodiment.

FIG. 11 illustrates sensing the medium as busy based on only SR disabled capability. After an initial packet detection delay D1 (such as 4 μsec), an HE device using an SR procedure may identify the inter-BSS frame 1102 as an inter-BSS frame after a second duration D2 when the inter-BSS frame 1102 is an HE frame including a Color field. The HE device using the SR procedure would identify the inter-BSS frame 1102 as an inter-BSS frame after a third duration D3 when the inter-BSS frame 1102 is an Legacy frame having a MAC address that does not correspond to a device associated with the BSS of the device receiving the inter-BSS frame 1102. For the purpose of performing a transmission, the HE device considers the medium available after the second or third duration D2 or D2.

However, for purposes of calculating the Channel Utilization based on only SR disabled capability, the HE device using an SR procedure sees its medium as occupying the channel for the entire fourth duration D4.

Figure 12:
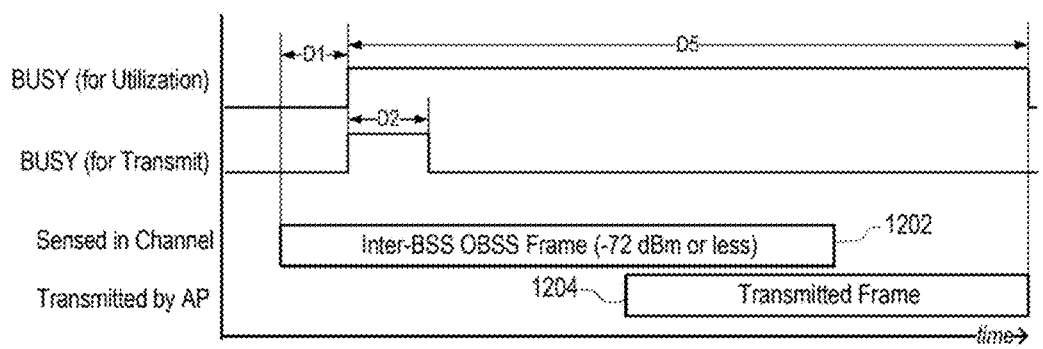
FIG. 12 further illustrates a Spatial Reuses operation, according to an embodiment.

FIG. 12 further illustrates a Spatial Reuses operation of the embodiment. A first duration D1 after reception of a first frame 1202, an AP detects the channel as busy. A second duration D2 after the first duration D1, the AP determines that the first frame 1202 is an inter-BSS frame using Color information in the first frame 1202. The AP then continues to sense the medium as busy for the channel utilization calculation, but because the received signal strength of the frame first 1202 is less than the OBSS_PD threshold, stops considering the medium busy for purposes of determining whether to transmit.

As a result, the AP starts transmitting a second frame 1204 while the first frame 1202 is still being detected. The AP senses the medium as busy for utilization calculation throughout the durations of the first frame 1202 and the second frame 1204, as indicated by a fifth duration D5.

In the example of FIG. 8 in this embodiment, the first AP AP1 would broadcast a first BSS Load element indicating a Channel Utilization of 70% and the second AP AP2 would broadcast a second BSS Load element indicating a Channel Utilization of 50%.

For non-HE stations, the information in Channel Utilization field is exact as it is an exact ratio of channel utilization for that AP. For 11ax (HE) stations, which can achieve better throughput by using the SR mechanism to access the medium when receiver power is lower than the OBSS_PD threshold, the HE station can expect the channel to be at least as available as is indicated in the Channel Utilization field.

The unassociated station 842, regardless of whether it is an HE station or not, may then determine to associate with the second AP AP2, and can expect to see a no more than 50% busy channel.

In embodiments, an AP can provide both legacy (non-HE) stations and 11ax (HE) stations with reasonable BSS load information so as to increase the probability of achieving a high throughput.

Unlike for DL MU-MIMO as used in Very High Throughput (VHT) WLANs according to an IEEE Std 802.11ac standard, a WLAN according to an IEEE 802.11ax standard (hereinafter, an HE WLAN) may require more protection mechanisms for MU transmission.

One reason is that the operation scenario for an HE WLAN is different: for example, HE WLANs are intended to operate in denser wireless environments, and to provide outdoor support. Also, the coverage of a BSS of an HE WLAN may be larger compared to a BSS of a VHT WLAN. These factors encourage the use of more robust protection mechanisms.

Another reason is that an HE WLAN supports not only DL MU transmission but also UL MU transmission. In the case of UL MU transmission, as frames transmitted from each station are larger, the HE WLAN requires more protection for stations which are close to each transmitting or receiving station.

Another reason is that in an HE WLAN, an AP may exercise more control of the medium through increased use of a scheduled access mechanism, which may lead to more frequent use of OFDMA transmissions, MU-MIMO transmissions, or both.

UL MU PPDUs (whether MU-MIMO, OFDMA, or both) are sent in response to a Trigger frame sent by the AP. The Trigger frame may have enough station-specific information and assigned resource units to identify the stations which are supposed to transmit UL MU PPDUs.

The Trigger frame is used to allocate resource for UL MU transmission and to solicit an UL MU transmission after the PPDU that carries the Trigger frame. The Trigger frame also carries other information that is required by the responding stations to perform the UL MU transmissions.

FIG. 13 illustrates a frame format for a Trigger frame 1300 suitable for use in an HE WLAN, according to an embodiment. A value of Receiver Address (RA) field 1306 of the Trigger frame 1300 is the address of a recipient station or a broadcast address corresponding to one or more recipient stations. A value of a TA field 1308 of the Trigger frame 1300 is an address of the station transmitting the Trigger frame 1300.

A Common Info field 1310 of the Trigger frame 1300 includes the following subfields:

A Trigger Type subfield 1322 that indicates a type of the Trigger frame 1300. Depending on the type of the Trigger frame 1300, the Trigger frame 1300 can include an optional Type-specific Common Info field 1352 and (in each Per User Info field(s) 1312-1 to 1312-*n*) optional Type-specific Per User Info fields 1376. Table 3 of FIG. 15 shows an encoding of the Trigger Type subfield 1322 for valid Trigger Types.

A Length subfield 1324 that indicates the value of an L-SIG Length field of an HE trigger-based PPDU transmitted in response to the Trigger frame 1300.

A Cascade Indication subfield 1326 that when set to 1 indicates that a subsequent Trigger frame follows the current Trigger frame, and that otherwise has a value of 0.

A Carrier Sense (CS) Required subfield 1328. The CS Required subfield 1328 being set to 1 indicates that station(s) identified in the Per User Info field(s) 1312-1 to 1312-*n* of the Trigger frame 1300 are required to use Energy Detect (ED) to sense the medium and to consider the medium state and a NAV in determining whether to respond to the Trigger frame 1300. The CS Required subfield being set to 0 indicates that the station(s) identified in the Per User Info field(s) 1312-1 to 1312-*n* are not required to consider the medium state or the NAV in determining whether to respond to the Trigger frame 1300.

A CP and LTF Type subfield 1332 that indicates a CP and an HE-LTF type of the HE trigger-based PPDU transmitted in response to the Trigger frame 1300. The CP and LTF field encoding is shown in Table 2 of FIG. 14 (CP and LTF field encoding).

An HE-SIG-A Reserved subfield 1348 that indicates contents of an HE-SIG-A field of the HE trigger-based PPDU transmitted in response to the Trigger frame 1300. All values in the HE-SIG-A Reserved subfield 1348 are set to 1.

A Spatial Reuse (SR) subfield 1346, described below.

Each of the Per User Info fields 1312-1 to 1312-*n* includes the following subfields:

A User Identifier subfield 1362 indicating an Association Identifier (AID) of a station allocated a Resource Unit (RU) in which to transmit one or more MPDU(s) in the HE trigger-based PPDU transmitted in response to the Trigger frame 1300.

An RU Allocation subfield 1364 indicating an RU to be used to transmit the HE trigger-based PPDU of the station identified by User Identifier subfield 1362. The first bit of the RU Allocation subfield 1364 indicates whether the allocated RU is located in a primary or non-primary 80 MHz. The mapping of the subsequent seven bits indices of the RU Allocation subfield 1364 to the RU allocation is shown in Table 4 of FIG. 16.

A Coding Type subfield 1366 indicating a coding type of the HE trigger-based PPDU transmitted in response to the Trigger frame 1300 of the station identified by the User Identifier subfield 1362, and set to 0 for BCC and to 1 for LDPC.

An MCS subfield 1368 indicating an MCS of the HE trigger-based PPDU transmitted in response to the Trigger frame 1300 by the station identified by User Identifier field 1362.

A Dual Carrier Modulation (DCM) subfield 1370 indicating dual carrier modulation of the HE trigger-based PPDU transmitted in response to the Trigger frame 1300 by the station identified by User Identifier field 1362. A value of 1 indicates that the HE trigger-based PPDU shall use DCM, and a value of 0 indicates that it shall not.

A Spatial Stream (SS) Allocation subfield 1372 indicating spatial streams of the HE trigger-based PPDU transmitted in response to the Trigger frame 1300 by the station identified by User Identifier field 1362.

A Padding field 1314 extends the frame length of the Trigger frame 1300 to give the recipient stations more time to prepare their respective responses.

Stations in an HE WLAN perform a CCA before responding to the Trigger frame 1300 when the CS Required indication 1328 in a Trigger frame 1300 indicates that it is required, and may not perform the CCA when the CS Required indication 1328 indicates it is not required. As a result Spatial Reuse (SR) transmissions (that is, transmissions from stations in Overlapping BSS (OBSS) areas that are performed at the same time as other transmissions within the overlapped BSSs) may affect UL MU transmission. It is because given the HE format of an OBSS Trigger frame, stations may be allowed to start a SR transmission before the end of the Trigger frame when SR condition met. So the OBSS station shall indicate the medium as BUSY for the length of the Trigger frame which is HE SU PPDU format or HE extended range SU PPDU when the SR field in the HE-SIG-A of the Trigger frame is set to a specific value.

To increase system throughput, the IEEE 802.11 Task Group ax has provided for more aggressive channel access in an HE WLAN by increasing a CCA threshold value. However, increasing the CCA threshold value may result in more frequent packet collision and degradation of a Quality of Service (QoS) of a packet delivery. Especially, if a station assesses a wireless medium and a frame that occupies the wireless medium is to or from stations of the same BSS that the station is associated with (that is, if the medium is occupied by an intra-BSS frame), then even if the CCA threshold value is increased and the station initiates a transmission to an AP of the BSS, the transmission will may be unsuccessful because the AP may be currently in the middle of transmission or reception with other stations.

In light of this, CCA related information or spatial reuse related information may be indicated in the physical layer header of a frame such that any station that identifies a start of a frame can utilize this information in deciding whether to adjust a CCA threshold value.

An example of an indication of spatial reuse information in a physical layer header is a Color field of a frame. The Color field includes (partial) BSS information of a transmitter that the frame was transmitted by.

FIG. 17 illustrates a process 1700 for determining whether to perform an SR transmission based on an OBSS_PD threshold level, according to an embodiment. The process 1700 may be performed by an HE station in an OBSS area.

At S1702, a station identifies a start of a frame when assessing a wireless medium when receiving a PPDU.

At S1704, the process 1700 checks a Color field of the frame. If the Color field information is the same as the Color of the station (indicating that the transmitter of the frame has a high probability of being associated with the same BSS as the station) the process 1700 proceeds to S1706; otherwise when the Color field information is different from the Color of the station, the process 1700 proceeds to S1708.

At S1706 process 1700 sets or updates a value of an intra-BSS NAV according to information in the received frame, and assesses the wireless medium as BUSY. The process 1700 then ends.

At S1708, since the Color field information is different from the Color of the station, the process 1700 compares a received signal strength (RSSI) value with a value of a first threshold (e.g., an Overlapping BSS Packet Detection (OBSS_PD) threshold). When the RSSI value is greater than the OBSS_PD threshold value, the process 1700 proceeds to S1710; otherwise the process 1700 proceeds to S1712.

At S1710, the process 1700 sets or updates an inter-BSS NAV according to information in the received frame, and assesses the wireless medium as BUSY.

At S1712, since the RSSI value is below the OBSS_PD threshold value, the stations shall ignore NAV and, when the medium condition indicates IDLE as a channel sensing result, the stations resumes a backoff countdown process (such as a backoff procedure described with reference to FIG. 4, above) after an xIFS period (e.g. SIFS, DIFS, or EIFS) to be ready for an SR transmission.

This OBSS_PD threshold level mechanism corresponds to a receive power of a frame from an OBSS station (that is, from a station other than a station in the same BSS as the receiving station). Receiving the frame, the receiving station measures receive power. When measured receive power is lower than the OBSS-PD threshold, the station determines a medium to be IDLE for purposes of initiating an SR transmission.

FIGS. 18A and 18B illustrate an SR transmission according to an embodiment. FIG. 18A shows a first BSS 1800 and a second BSS 1810 having an OBSS area 1820. The first BSS 1800 includes a first station 1804 (STA1) and a second station 1802 (STA2). The second station STA2 is an AP. The second BSS 1810 includes a third station 1812 (STA3) and a fourth station 1814 (STA4).

As shown in FIG. 18B, the second station STA2 transmits a Trigger frame 1806 to the first station STA1. In response, the first station STA1 transmits an UL MU PPDU 1808 to the second station STA2 in UL MU PPDU transmission 1808A. The transmission of the UL MU PPDU 1808 by the first station STA1 also results in an (unintended) interference transmission 1808B to the third station STA3.

The third station STA3 can initiate a SR transmission when a backoff count reach down to 0 when 1) a received frame is an inter-BSS PPDU whose Color information or Address information does not match to myBSS ID information and 2) a receive power (e.g. $RSSI_{ULPPUD@STA3}$) of the inter-BSS PPDU is smaller than a OBSS_PD threshold level.

As a result, because the received interference transmission 1808B includes an inter-BSS frame and the receive power $RSSI_{ULPPUD@STA3}$ of the interference transmission 1808B is less that the OBSS_PD level, the third station STA3 may transmit a PPDU 1816 to the fourth station STA4 while the UL MU PPDU 1808 is being transmitted by the first station STA1.

While the example shows the transmission of the Trigger frame 1806 from the second station STA2 to the first station STA1, embodiments are not limited thereto, and another type of frame may be substituted for the Trigger frame 1806.

In addition to the OBSS_PD threshold mechanism above, Opportunistic Adaptive CCA (OA-CCA) may be used to provide more aggressive use of the medium by SR transmissions.

The OA-CCA mechanism operates according to an interference level caused by an SR transmission. When receiving an inter-BSS frame from an OBSS station, the receiving station determines a transmit power for SR transmissions according to an estimated interference level to be affected to the receiving OBSS station. When the station's transmit power is lower than the transmit power that would produce the interference level to be virtually affected to the receiving OBSS station, the station determines a medium to be IDLE up to the end of the frame.

FIGS. 19A and 19B illustrate an operation of an OA-CCA mechanism, according to an embodiment. FIG. 19A shows a first BSS 1900 and a second BSS 1910 having an OBSS area 1920. The first BSS 1900 includes a first station 1904 (STA1) and a second station 1902 (STA2). The second station STA2 is an AP. The second BSS 1910 includes a third station 1912 (STA3) and a fourth station 1914 (STA4).

As shown in FIG. 19B, the second station STA2 transmits a Trigger frame 1906 to the first station STA1 in Trigger frame transmission 1906A. The transmission of the Trigger frame 1906 by the second station STA2 also results in a (unintended) first interference transmission 1906B to the third station STA3.

In response to the Trigger frame 1906, the first station STA1 transmits an UL MU PPDU 1908 to the second station STA2 in a UL MU PPDU transmission 1908A. The transmission of the UL MU PPDU 1908 by the first station STA1 also results in an (unintended) second interference transmission 1908B to the third station STA3.

The third station STA3 detects two valid OBSS (that is, inter-BSS) PPDUs in a row. The third station STA3 measures a received signal strength ($RSSI_{trigger\ frame@STA3}$) of the first inter-BSS PPDU (here, the Trigger frame 1906) carried by the first interference transmission 1906B from the second station STA2. Receiving the first inter-BSS PPDU in the first interference transmission 1906B which contains the indication requesting to defer the SR transmission to the end of the first inter-BSS PPDU regardless of SR conditions met when 1906B is the Trigger frame, the third station STA3 defers any spatial reuse transmissions until after the end of the first inter-BSS PPDU.

When the third station STA3 receives the second inter-BSS PPDU (the UL MU PPDU 1908, transmitted in response to the Trigger frame 1906, and carried in the second interference transmission 1908B), the third station STA3 obtains Spatial Reuse Parameters (SRPs) from an HE-SIG-A field of the UL MU PPDU 1908. Once the SRPs are obtained, the third station STA3 can initiate when a certain SR condition is met, during the remainder of the UL PPDU duration, an SR transmission of a PPDU 1916 using a transmission power of TX-Power$_{STA3}$.

A value of an SRP in the HE-SIG-A field of the UL MU PPDU 1908 is obtained by copying an SRP value from the Trigger frame 1906. The value of the SRP corresponds to a transmit power TX_PWR$_{STA2}$ of second station STA2 that transmitted the Trigger frame 1906 plus an Acceptable Receiver Interference level ARI$_{STA2}$ of the second station STA2:

$$SRP = TX\_PWR_{STA2} + ARI_{STA2} \qquad \text{Equation 1}$$

In an embodiment, the Acceptable Receiver Interference level ARI$_{STA2}$ of the second station STA2 may depend on the MCS used by a transmission.

The transmission power TX-Power$_{STA3}$ used by the third station STA3 must be less than SRP−RSSI$_{trigger\ frame@STA3}$:

$$TX\text{-}Power_{STA3} < SRP - RSSI_{trigger\ frame@STA3} \qquad \text{Equation 2}$$

Combining Equations 1 and 2 produces:

$$TX\text{-}Power_{STA3} < TX\_PWR_{STA2} + ARI_{STA2} - RSSI_{trigger\ frame@STA3} \qquad \text{Equation 3}$$

Since the TX_PWR$_{STA2}$−RSSI$_{trigger\ frame@STA3}$ is substantially equal to the pass loss Pass_LOSS$_{STA2\_STA3}$ between STA2 and STA3, a third interference transmission 1916B in FIG. 19A generated by the third station STA3 using transmission power TX-Power$_{STA3}$ has a received power less than the Acceptable Receiver Interference level ARI$_{STA2}$ of the second station STA2 when the third interference transmission 1916B arrives at the second station STA2:

$$TX\text{-}Power_{STA3} - Pass\_LOSS_{STA2\_STA3} < ARI_{STA2} \qquad \text{Equation 4}$$

In this document, the Spatial Reuse Parameter (SRP) field and the Spatial Reuse (SR) field mean the same and are used interchangeably.

For a trigger-based PPDU that is an UL PPDU, the four 4-bit SR fields of an HE SIG-A field of the UL PPDU are given values as follows according to the operating bandwidth of the UL PPDU:

For a 20 MHz operating bandwidth, one SR field corresponds to the entire 20 MHz (the other 3 fields indicate identical values).

For a 40 MHz operating bandwidth, two SR fields respectively correspond to the two 20 MHz bandwidths of the operating bandwidth, and the other 2 fields have identical values.

For an 80 MHz operating bandwidth, the four SR fields respectively correspond to the four 20 MHz bandwidths of the operating bandwidth.

For a 160 MHz operating bandwidth, the four SR fields respectively correspond to the four 40 MHz bandwidths of the operating bandwidth.

For an 80+80 MHz operating bandwidth, the four SR fields respectively correspond to the four 40 MHz bandwidths of the operating bandwidth.

In an embodiment, each SR field decodes as one of 14 SRP values corresponding to different power levels, or as SR not allowed, or as a reserved value.

Figure 20:
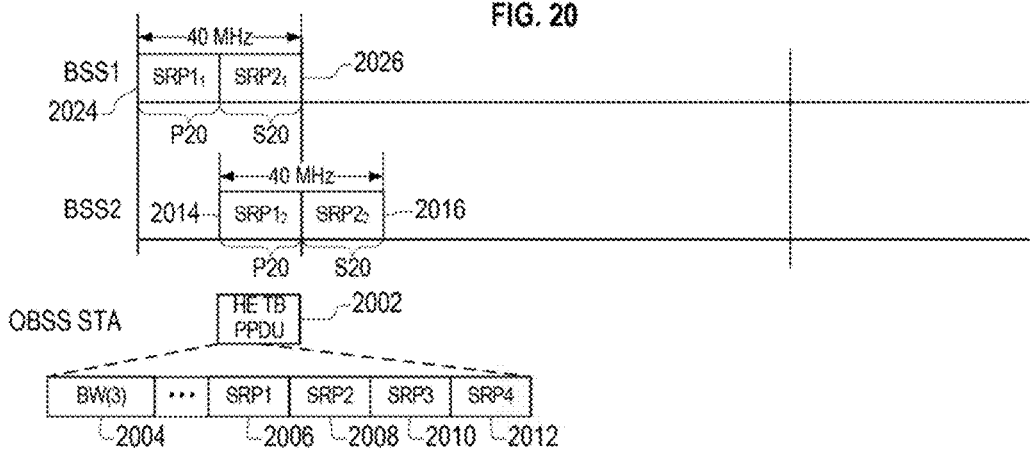
FIG. 20 illustrates an issue related to OA-CCA, specifically with regard to operations in a 2.4 GHz band/channel center frequency.

FIG. 20 illustrates an issue in OA-CCA specifically with regard to operations in a 2.4 GHz band.

When channels are assigned according to IEEE Std 802.11ac in a 5 GHz band, only restricted contiguous channel utilizations are allowed, except for 80+80 MHz bandwidths. A primary 20 MHz bandwidth, P20, may be located in any 20 MHz for a 40, 80, or 160 MHz bandwidth. However, once the channel for the primary 20 MHz bandwidth is chosen, the channels used by the secondary 20 MHz bandwidth, secondary 40 MHz bandwidth if present, and secondary 80 MHz bandwidth if present, are determined entirely by the location of the primary 20 MHz bandwidth.

An HE Trigger-Based PPDU 2002 transmitted by a device in a first BSS BSS1 includes, in an HE-SIG-A field, a Bandwidth indication 2004 and first to fourth Spatial Reuse Parameters (SRPs) 2006 to 2012 (SRP1 to SRP4).

When the HE Trigger-Based PPDU 2002 is transmitted by a device in a first BSS BSS1, the Bandwidth indication 2004 indicates that the operational bandwidth of the HE Trigger-Based PPDU 2002 is 40 MHz, and accordingly, the first SRP SRP1 has a first SRP1 value SRP1$_1$ indicating an SRP of a first primary 20 MHz (P20) bandwidth 2024 and the second SRP SRP2 has a first SRP2 value SRP2$_1$ indicating an SRP of first secondary 20 MHz (S20) bandwidth 2026. The first SRP SRP3 and the first SRP SRP4 of the HE Trigger-Based PPDU 2002 have values equal to the first SRP1 value SRP1$_1$ and the first SRP2 value SRP2$_1$, respectively.

When the HE Trigger-Based PPDU 2002 is transmitted by a device in a second BSS BSS2, the Bandwidth indication 2004 indicates that the operational bandwidth of the HE Trigger-Based PPDU 2002 is 40 MHz, and accordingly, the second SRP SRP1 has a second SRP1 value SRP1$_2$ indicating an SRP of a second primary 20 MHz (P20) bandwidth 2014 and the second SRP SRP2 has a second SRP2 value SRP2$_2$ indicating an SRP of second secondary 20 MHz (S20) bandwidth 2016. The second SRP SRP3 and SRP4 of the HE Trigger-Based PPDU 2002 have values equal to the second SRP1 and SRP2 values SRP1$_2$ and SRP2$_2$, respectively.

A device (here, the OBSS STA) operating in the 2.4 GHz band and receiving the HE Trigger-Based PPDU 2002 needs to determine which SRP to use in performing the OA-CCA based transmission. However, the information in the HE-SIG-A field of the HE Trigger-Based PPDU 2002 only indicates the SRP based on the relative positions of the 20 MHz bandwidths. Because there is no absolute frequency information in the HE-SIG-A field of the HE Trigger-Based PPDU 2002, the device cannot determine whether to use the first SRP SRP2 or the second SRP SRP1 when performing the OA-CCA. In the example, when the device receives the HE Trigger-Based PPDU 2002 from the first BSS BSS1, an OA-CCA transmission by the device shall use the first SRP SRP2 value SRP2$_1$ that indicates an SRP of the first secondary 20 MHz (S20) bandwidth 2026 in performing the OA-CCA, but the device cannot make that determination using the information shown in the HE Trigger-Based PPDU 2002.

Figure 21:
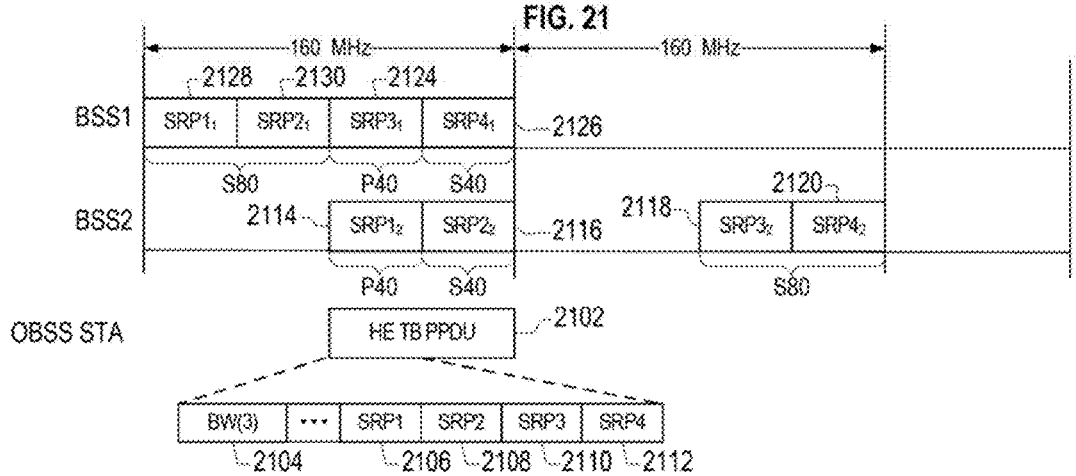
FIG. 21 shows an example of an issue related to OA-CCA in a 5 GHz band.

FIG. 21 shows another example of an issue in OA-CCA. An HE Trigger-Based PPDU 2102 includes, in an HE-SIG-A field, a Bandwidth indication 2104 and first to fourth SRPs 2106 to 2112 (SRP1 to SRP4). In the example of FIG.

21, a device in a first BSS BSS1 has an operational bandwidth of 160 MHz, and a device in a second BSS BSS2 has an operational bandwidth of 80+80 MHz.

The device of the first BSS BSS1 operates in a first primary 40 MHz (P40) bandwidth 2124, a first secondary 40 MHz (S40) bandwidth 2126, a first third 40 MHz bandwidth 2128, and a first fourth 40 MHz bandwidth 2130. The first third 40 MHz bandwidth 2128 and the first fourth 40 MHz bandwidth 2130 make up a first secondary 80 MHz (S80) bandwidth.

When a HE Trigger-Based PPDU 2102 is from the first BSS BSS1, the first to fourth SRPs SRP1 to SRP4 respectively indicate a first SRP1 value $SRP1_1$ of a first third 40 MHz bandwidth 2128, a first SRP2 value $SRP2_1$ of a first fourth 40 MHz bandwidth 2130, a first SRP3 value $SRP3_1$ of a first Primary 40 MHz bandwidth 2124, and a first SRP4 value $SRP4_1$ of a first secondary 40 MHz bandwidth 2126.

The device of the second BSS BSS2 operates in a second primary 40 MHz (P40) bandwidth 2114, a second secondary 40 MHz (S40) bandwidth 2116, a second third 40 MHz bandwidth 2118, and a second fourth 40 MHz bandwidth 2120. The second third 40 MHz bandwidth 2118 and the second fourth 40 MHz bandwidth 2120 make up a second secondary 80 MHz (S80) bandwidth.

When a HE Trigger-Based PPDU 2102 is from the second BSS BSS2, the first to fourth SRPs SRP1 to SRP4 respectively indicate a second SRP1 value $SRP1_2$ of a second primary 40 MHz bandwidth 2114, a second SRP2 value $SRP2_2$ of a second secondary 40 MHz bandwidth 2116, a second SRP3 value $SRP3_2$ of a second third 40 MHz bandwidth 2118, and a second SRP4 value $SRP4_2$ of a second fourth 40 MHz bandwidth 2120.

Depending on where a HE Trigger-Based PPDU 2102 comes from, which is unknown to a device (here, an OBSS STA), the device cannot determine which SR fields need to be used for SR transmission using OA-CCA. It could be the third and fourth SRPs SRP3 and SRP4 respectively including the first SRP3 and SRP4 values $SRP3_1$ and $SRP4_1$ when received from the first BSS BSS1 or it could be the first and second SRPs SRP1 and SRP2 respectively including the second SRP1 and SRP2 values $SRP1_2$ and $SRP2_2$ when received from the second BSS BSS2.

Figure 22:
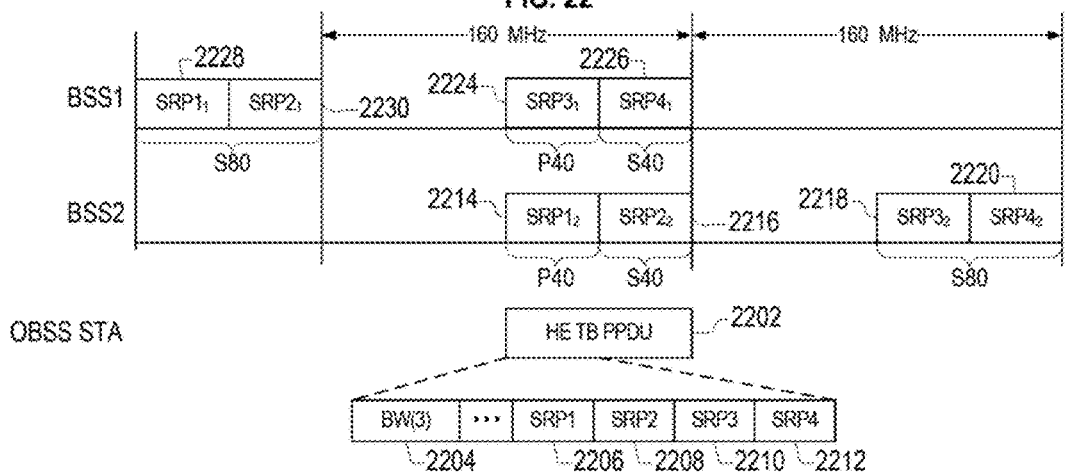
FIG. 22 shows another example of an issue related to OA-CCA in a 5 GHz band.

FIG. 22 shows another example of an issue in OA-CCA. An HE Trigger-Based PPDU 2202 includes, in an HE-SIG-A field, a Bandwidth indication 2204 and first to fourth SRPs 2206 to 2212 (SRP1 to SRP4). In the example of FIG. 22, a device in a first BSS BSS1 has an operational bandwidth of 80+80 MHz, and a device in a second BSS BSS2 has an operational bandwidth of 80+80 MHz.

The device of the first BSS BSS1 operates in a first primary 40 MHz (P40) bandwidth 2224, a first secondary 40 MHz (S40) bandwidth 2226, a first third 40 MHz bandwidth 2228, and a first fourth 40 MHz bandwidth 2230. The first third 40 MHz bandwidth 2228 and the first fourth 40 MHz bandwidth 2230 make up a first secondary 80 MHz (S80) bandwidth.

When a HE Trigger-Based PPDU 2204 is from the first BSS BSS1, the first to fourth SRPs SRP1 to SRP4 respectively indicate a first SRP1 value $SRP1_1$ of a first third 40 MHz bandwidth 2228, and a first SRP2 value $SRP2_1$ of a first fourth 40 MHz bandwidth 2230, a first SRP3 value $SRP3_1$ of a first primary 40 MHz bandwidth 2224, a first SRP4 value $SRP4_1$ of a first secondary 40 MHz bandwidth 2226.

A device of the second BSS BSS2 operates in a second primary 40 MHz (P40) bandwidth 2214, a second secondary 40 MHz (S40) bandwidth 2216, a second third 40 MHz bandwidth 2218, and a second fourth 40 MHz bandwidth 2220. The second third 40 MHz bandwidth 2218 and the second fourth 40 MHz bandwidth 2220 make up a second secondary 80 MHz (S80) bandwidth.

When the HE Trigger-Based PPDU 2204 is from the second BSS BSS2, the first to fourth SRPs SRP1 to SRP4 respectively indicate a second SRP1 value $SRP1_2$ of a second primary 40 MHz bandwidth 2214, a second SRP2 value $SRP2_2$ of a second secondary 40 MHz bandwidth 2216, a second SRP3 value $SRP3_2$ of a second third 40 MHz bandwidth 2218, and a second SRP4 value $SRP4_2$ of a second fourth 40 MHz bandwidth 2220.

Depending on where the HE Trigger-Based PPDU 2204 comes from, which is unknown to a device, the device cannot determine which SR fields need to be used for SR transmission using OA-CCA. It could be the second SRPs SRP1 and SRP2 or it could be the first SRPs SRP3 and SRP4.

Embodiments include methods to indicate exact channel position in order to determine which SR parameter values among the multiple SR fields are used for each 20 MHz or 40 MHz channel depending on an operating channel bandwidth (e.g. a 20 MHz/40 MHz/80 MHz/160 MHz/80+80 MHz channel bandwidth).

In an embodiment, in a Trigger-based PPDU transmitted in response to Trigger frame, an HE-SIG-A field includes multiple 4-bit SR fields (totaling 16 bits) and a frequency location field which corresponds to a channel location. The frequency location field may also be referred to as a channel information field.

Values of the SR field in HE-SIG-A which copied from values of the SR field in Trigger frame indicate the condition on whether SR transmission is allowed on each 20 MHz or 40 MHz channel.

The frequency location field is a frequency location of a channel.

The multiple 4-bit SR fields are signaled as indicated below:

For a 20 MHz operating bandwidth, one SR field corresponds to the entire 20 MHz (the other 3 fields indicate identical values).

For a 40 MHz operating bandwidth, two SR fields respectively correspond to the two 20 MHz bandwidths of the operating bandwidth, and the other 2 fields have identical values.

For an 80 MHz operating bandwidth, the four SR fields respectively correspond to the four 20 MHz bandwidths of the operating bandwidth.

For a 160 MHz or 80+80 MHz operating bandwidth, the four SR fields respectively correspond to the four 40 MHz bandwidths of the operating bandwidth.

The frequency location field indicates a frequency location of an i-th SR field. The i-th SR field may be a first SR field.

For 20 MHz, the frequency location field indicates a location of a 20 MHz bandwidth having the SR parameter indicated by the i-th SR field among the multiple SR fields.

For 40 MHz, the frequency location field indicates a location of a 20 MHz bandwidth having the SR parameter indicated by the i-th SR field among the multiple SR fields.

For 80 MHz, the frequency location field indicates a location of a 20 MHz bandwidth having the SR parameter indicated by the i-th SR field among the multiple SR fields.

For 160 MHz and 80+80 MHz, the frequency location field indicates a location of a 40 MHz bandwidth having the SR parameter indicated by the i-th SR field among the multiple SR fields The i-th SR field could be the first, second, third, or fourth 20 MHz or 40 MHz bandwidth in a frequency domain. In an embodiment, the frequency location is a channel number. In an embodiment, a size of the frequency location field is 8 bits.

Returning to the examples of FIGS. 21 and 22, a first station receives a HE Trigger-Based PPDU frame from the second BSS BSS2, and a frequency location field of a HE-SIG-A field of the frame indicates a location of the bandwidth corresponding to the first SRP SRP1 (that is, the first SRP SRP1 corresponding to the primary 40 MHz channel of the second BSS BSS2, and indicating the second SRP1 value $SRP1_2$), the location being the same as a location used by the primary 40 MHz channel of the first station (the 40 MHz bandwidth 2114 in FIG. 21, and the 40 MHz 2214 in FIG. 22). The location of the bandwidth corresponding to the second SRP SRP2 of the received frame can be determined by the first station from the location of the bandwidth corresponding to the first SRP SRP1 of the received frame. The first station doesn't have any information on frequency location for the second SRPs SRP3 value $SRP3_2$ to SRP4 value $SRP4_2$.

For 20 MHz, the first station could initiate SR transmission up to 20 MHz when SR conditions of OA-CCA, determined using the second SRP1 value $SRP1_2$ of the received frame from the second BSS BSS2, on the 20 MHz are met.

For 40 MHz, the first station could initiate SR transmission up to 40 MHz when SR conditions of OA-CCA, determined using the second SRP1 and SRP2 values $SRP1_2$ and $SRP2_2$ of the received frame from the second BSS BSS2, on each 20 MHz are met.

For 80 MHz, the first station could initiate SR transmission up to 80 MHz when SR conditions of OA-CCA, determined using the second SRP1, SRP2, SRP3 and SRP4 values $SRP1_2$, $SRP2_2$, $SRP3_2$ and $SRP4_2$ of the received frame from the second BSS BSS2, on each 20 MHz are met.

For 160/80+80 MHz,

If a value in the frequency location field of the i-th 20 MHz doesn't match with the first devices i-th 20 MHz location wherein the value in the frequency location field of the i-th 20 MHz is meant to belong to the first device's first 80 MHz, the first station could initiate SR transmission up to 160 MHz when SR conditions of OA-CCA on each 40 MHz are met.

Otherwise, the first station could initiate SR transmission up to 80 MHz which includes its i-th 20 MHz when SR conditions of OA-CCA on each 40 MHz are met.

FIG. 23 illustrates an example of fields in an HE-SIG-A field 2300 according to an embodiment. The fields contains first, second, third, and fourth SR fields 2302, 2304, 2306, and 2308, and a frequency location field 2310. The frequency location field 2310 indicates a frequency location of the $1^{st}$ 20 MHz (for 20, 40, and 80 MHz bandwidths) or 40 MHz (for 160 or 80+80 MHz bandwidths) bandwidth corresponding to the first SR field 2302.

FIG. 24 illustrates an example of SR operation in 2.4 GHz band according to an embodiment.

The HE Trigger-based PPDU 2402 includes bandwidth information indicating 40 MHz operation and a frequency information field indicating channel k as the $1^{st}$ 20 MHz bandwidth corresponding to a second primary 20 MHz channel 2404. A device, which knows the channels it uses for a first primary and secondary 20 MHz channels 2414 and 2416 are channels k−1 and k, respectively, determines using the frequency information field of the HE Trigger-based PPDU 2402 that the first SR field SRP1 of the HE Trigger-based PPDU 2402 (indicating the second SRP1 value $SRP1_2$) includes SR information for channel k and should be used when performing SR transmissions.

FIG. 25 illustrates another example of SR operation according to an embodiment. A first device in a first BSS BSS1 operates using a 160 MHz bandwidth having a first primary 40 MHz (P40) bandwidth 2514 in a channel k+2, a first secondary 40 MHz (S40) bandwidth 2516 in a channel k+3, a first tertiary (i.e. third) 40 MHz bandwidth 2518 in a channel k, and a first quaternary (i.e. fourth) 40 MHz bandwidth 2520 in a channel k+1. The first tertiary 40 MHz bandwidth 2518 and first quaternary 40 MHz bandwidth 2520 comprise a first secondary 80 MHz (S80) bandwidth.

A second device operates in a second BSS BSS2 using an 80+80 MHz bandwidth having a second primary 40 MHz (P40) bandwidth 2504 in a channel k+2, a second secondary 40 MHz (S40) bandwidth 2506 in a channel k+3, a second tertiary 40 MHz bandwidth 2508 in a channel higher than k+3, and a second quaternary 40 MHz bandwidth 2510 in a channel higher than k+3. The second tertiary 40 MHz bandwidth 2508 and second quaternary 40 MHz bandwidth 2510 comprise a second secondary 80 MHz (S80) bandwidth.

A HE Trigger-based PPDU 2502 includes bandwidth information indicating 80+80 MHz operation and a frequency information field indicating channel k+2 as the $1^{st}$ 40 MHz bandwidth corresponding to the second primary 40 MHz channel 2504. A device, which knows the channels it uses for the operating channels 2514 to 2520 are channels k+2, k+3, k, and k+1, respectively, determines using the frequency information field of the HE Trigger-based PPDU 2502 that the first SR field SRP1 of the HE Trigger-based PPDU 2502 includes SR information (the second SRP1 value $SRP1_2$) for the channel k+2 and that the second SR field SRP2 of the HE Trigger-based PPDU 2502 includes SR information (the second SRP2 value $SRP2_2$) for the channel k+3. As a result, the device concludes that the second SRP1 and SRP2 values $SRP1_2$ and $SRP2_2$ should be used when performing SR transmissions.

FIG. 26 illustrates another example of SR operation according to an embodiment. A first device in a first BSS BSS1 operates using a 80+80 MHz bandwidth having a first primary 40 MHz (P40) bandwidth 2618 in a channel k, a first secondary 40 MHz (S40) bandwidth 2620 in a channel k+1, a first tertiary 40 MHz bandwidth 2614 in a channel j, and a first quaternary 40 MHz bandwidth 2616 in a channel j+1, where j+1 is less than k. The first tertiary 40 MHz bandwidth 2614 and first quaternary 40 MHz bandwidth 2616 comprise a first secondary 80 MHz (S80) bandwidth.

A second device in a second BSS BSS2 operates using an 80+80 MHz bandwidth having a second primary 40 MHz (P40) bandwidth 2604 in a channel k, a second secondary 40 MHz (S40) bandwidth 2606 in a channel k+1, a second tertiary 40 MHz bandwidth 2608 in a channel higher than k+1, and a second quaternary 40 MHz bandwidth 2610 in a channel higher than k+1. The second tertiary 40 MHz bandwidth 2608 and second quaternary 40 MHz bandwidth 2610 comprise a second secondary 80 MHz (S80) bandwidth.

A HE Trigger-based PPDU 2602 includes bandwidth information and a frequency information field indicating channel k as the 1st 40 MHz bandwidth corresponding to the second primary 40 MHz channel 2604. A device, which knows the channels it uses for 2514 to 2620 are channels k, k+1, j, and j+1, respectively, determines using the frequency information field of the HE Trigger-based PPDU 2602 that the SRP1 of the HE Trigger-based PPDU 2602 includes SR information (the second SRP1 value SRP1$_2$) for the channel k and that the SRP2 of the HE Trigger-based PPDU 2602 includes SR information (the second SRP2 value SRP2$_2$) for the channel k+1. As a result, the device concludes that the second SRP1 and SRP2 values SRP1$_2$ and SRP2$_2$ should be used when performing SR transmissions.

Considering the limited number of bits available in an HE-SIG-A field, adding frequency location field to indicate channel location may be burdensome. Embodiments include methods to keep the combined length of the 4-bit SR fields and frequency location field (if any) at a total of 16 bits.

In an embodiment, a Trigger-based PPDU transmitted in response to a Trigger frame includes an HE-SIG-A field that includes multiple 4-bit SR fields having a total length of 16 bits. Values of the SR fields in the HE-SIG-A field are values respectively copied from corresponding SR fields in the Trigger frame transmitted by an AP and indicate respective conditions under which SR transmissions are allowed on each corresponding 20 MHz or 40 MHz channel of an operating bandwidth.

The multiple 4-bit SR fields are signaled as indicated below:
  For a 20 MHz operating bandwidth, one SR field corresponds to the entire 20 MHz (the other 3 fields indicate identical values).
  For a 40 MHz operating bandwidth, two SR fields respectively correspond to the two 20 MHz bandwidths of the operating bandwidth, and the other 2 fields have identical values.
  For an 80 MHz operating bandwidth, the four SR fields respectively correspond to the four 20 MHz bandwidths of the operating bandwidth.
  For a 160 MHz or 80+80 MHz operating bandwidth, the four SR fields respectively correspond to the four 40 MHz bandwidths of the operating bandwidth.

In an embodiment, a one-bit field in the HE-SIG-A field differentiates between 160 MHz and 80+80 MHz so that a device may have different behavior for each bandwidth.

The embodiment includes addition constraints on the SR field of the HE-SIG-A field that a station may choose when the station cannot determine which SR field or fields is or are to be used for SR transmission in the situations shown in FIGS. 20, 21, and 22.
  For a 40 MHz SR transmission in a 2.4 GHz band, the SR field with the most conservative value of the first and second SR fields, respectively corresponding to first and second 20 MHz bandwidths, (e.g. the minimum value among the first and second SR fields) is used.
  For 80+80 MHz SR transmission, the SR field with the most conservative value of the first and third SR fields, respectively corresponding to first and third 40 MHz bandwidths, (e.g. the minimum value among the first and third SR fields) is used, and the SR field with the most conservative value of the second and fourth SR fields, respectively corresponding to second and fourth 40 MHz bandwidths, (e.g. the minimum value among the second and fourth SR fields) is used FIGS. 27 and 28 illustrate aspects of the embodiment. FIG. 27 illustrates values of SR fields within an HE-SIG-A field of an UL Trigger-based PPDU transmitted from a first BSS in response to a Trigger frame, according to an operational bandwidth of the UL Trigger-based PPDU. The values of the SR fields are copied from values in SR fields of the Trigger frame.

FIG. 28 illustrates the SR values used for SR transmissions by a device, according to an operational bandwidth of a received inter-BSS UL Trigger-based PPDU transmission of an OBSS device. The device receives the UL Trigger-based PPDU transmitted from the first BSS and determines which SR field(s) is (are) used from the UL Trigger-based PPDU.

FIG. 28 shows that when the second device is performing a 40 MHz SR transmission in a 2.4 GHz band, the second devices uses a most conservative value of the SR field 1 and the SR field 2 to perform OA-CCA for primary and secondary 20 MHz channels of the 40 MHz SR transmission. A most conservative value of two SR fields is that value of the two SR fields that corresponds to a lower allowable transmission power for the second device than the other value of the two SR fields.

FIG. 28 shows that when the second device is performing an 80+80 MHz SR transmission, the second devices uses a most conservative value of the SR field 1 and the SR field 3 to perform OA-CCA for primary and tertiary 40 MHz channels of the 80+80 MHz SR transmission, and uses a most conservative value of the SR field 2 and the SR field 4 to perform OA-CCA for secondary and quaternary 40 MHz channels of the 80+80 MHz SR transmission.

FIG. 29 illustrates aspects of OA_CCA for a 40 MHz transmission having a channel center frequency in a 2.4 GHz band, according to an embodiment. In the example of FIG. 29, a first device in a first BSS BSS1 has an operational bandwidth of 40 MHz, and a second device in a second BSS BSS2 has an operational bandwidth of 40 MHz. The first device operates in a first primary 20 MHz (P20) bandwidth 2924 and a first secondary 20 MHz (S20) bandwidth 2926. The second device operates in a second primary 20 MHz bandwidth 2914 and a second secondary 20 MHz bandwidth 2916.

An HE Trigger-Based PPDU 2902 includes, in an HE-SIG-A field, a Bandwidth indication 2904 and first to fourth SRPs 2906 to 2912 (SRP1 to SRP4). When the HE Trigger-Based PPDU 2902 is from the first BSS BSS1, accordingly, the first SRP SRP1 indicates a first SRP1 value SRP1$_1$ of a first primary 20 MHz (P20) bandwidth 2924 and the second SRP SRP2 indicates an a first SRP2 value SRP2$_1$ of first secondary 20 MHz (S20) bandwidth 2926. The third and fourth SRPs SRP3 and SRP4 of the HE Trigger-Based PPDU 2902 have values equal to the first and second SRPs SRP1 and SRP2, respectively.

When the HE Trigger-Based PPDU 2902 is from the second BSS BSS2, accordingly, the first SRP SRP1 indicates a second SRP1 value SRP1$_2$ of a second primary 20 MHz (P20) bandwidth 2914 and the second SRP SRP2 indicates an a second SRP2 value SRP2$_2$ of second secondary 20 MHz (S20) bandwidth 2916. The third and fourth SRPs SRP3 and SRP4 of the HE Trigger-Based PPDU 2902 have values equal to the first and second SRPs SRP1 and SRP2, respectively.

A device receiving the HE Trigger-Based PPDU 2902 regardless of where it is from determines to use a conservative SRP having a value Min$_{SRP1\_2}$ equal to the most conservative of the values of the SRP1 and SRP2 received in the HE Trigger-Based PPDU 2902. The device uses the identical Min$_{SRP1\_2}$ as an SRP value when performing OA-CCA for an SR transmission in any of the 20 MHz channels.

FIG. 30 illustrates aspects of OA_CCA for an 80+80 MHz transmission, according to an embodiment. In the example of FIG. 30, a first device in a first BSS BSS1 has an operational bandwidth of 160 MHz, and a second device in a second BSS BSS2 has an operational bandwidth of 80+80 MHz. The first device operates in a first primary 40 MHz (P40) bandwidth 3024, a first secondary 40 MHz (S40) bandwidth 3026, a first third 40 MHz bandwidth 3028, and a first fourth 40 MHz bandwidth 3030. The first third 40 MHz bandwidth 3028 and the first fourth 40 MHz bandwidth 3030 make up a first secondary 80 MHz (S80) bandwidth.

The second device operates in a second primary 40 MHz (P40) bandwidth 3014, a second secondary 40 MHz (S40) bandwidth 3016, a second third 40 MHz bandwidth 3018, and a second fourth 40 MHz bandwidth 3020. The second third 40 MHz bandwidth 3018 and the second fourth 40 MHz bandwidth 3020 make up a second secondary 80 MHz (S80) bandwidth.

An HE Trigger-Based PPDU 3002 includes, in an HE-SIG-A field, a Bandwidth indication 3004 and first to fourth SRPs 3006 to 3012 (SRP1 to SRP4). When a HE Trigger-Based PPDU 3002 is from the first BSS BSS1, accordingly, the first to fourth SRPs SRP1 to SRP4 respectively indicate a first SRP1 value $SRP1_1$ of the first third 40 MHz bandwidth 3028, a first SRP2 value $SRP2_1$ of the first fourth 40 MHz bandwidth 3030, a first SRP3 value $SRP3_1$ of the first primary 40 MHz bandwidth 3024, and a first SRP4 value $SRP4_1$ of the first secondary 40 MHz bandwidth 3026. When a HE Trigger-Based PPDU 3002 is from the second BSS BSS2, accordingly, the first to fourth SRPs SRP1 to SRP4 respectively indicate a second SRP1 value $SRP1_2$ of the second primary 40 MHz bandwidth 3014, a second SRP2 value $SRP2_2$ of the second secondary 40 MHz bandwidth 3016, a second SRP3 value $SRP3_2$ of the second third 40 MHz bandwidth 3018, and a second SRP4 value $SRP4_2$ of the second fourth 40 MHz bandwidth 3020.

When a device receives a HE Trigger-Based PPDU 3002, the device can determine the bandwidth information and SRP values in an HE-SIG-A of the HE Trigger-Based PPDU. The device determines to use a first conservative SRP having a value $Min_{SRP1\_3}$ equal to the most conservative of the values of the SRP1 and the SRP3 received in the HE Trigger-Based PPDU 3002. The device determines to use a second conservative SRP having a value $Min_{SRP2\_4}$ equal to the most conservative of the values of the SRP2 and the SRP4 received in the HE Trigger-Based PPDU 3002.

The device uses the $Min_{SRP1\_3}$ value for an SRP when performing OA-CCA for an SR transmission in one or more of the first primary 40 MHz bandwidth 3024 and the first third 40 MHz bandwidth 3028, and uses the $Min_{SRP2\_4}$ value for an SRP when performing OA-CCA for an SR transmission in one or more of the first secondary 40 MHz bandwidth 3026 and the first fourth 40 MHz bandwidth 3030 when the Trigger-Based PPDU 3002 from the first BSS BSS1. However, the device determines to use the $Min_{SRP1\_3}$ or $MIN_{SRP2\_4}$ wherein the device doesn't need to know which operating band is assigned for the HE Trigger-Based PPDU 3002.

As shown in FIGS. 29 and 30, even though a device does not have any frequency location information on which SR fields are located on which 20 MHz or 40 MHz channels, the embodiment allows that after receiving the SR fields in an HE-SIG-A field of a received inter-BSS HE Trigger-based PPDU, the device may:

For a 20 MHz received inter-BSS HE Trigger-based PPDU, initiate an SR transmission of up to 20 MHz bandwidth when SR conditions of OA-CCA on each 20 MHz are met.

For a 40 MHz received inter-BSS HE Trigger-based PPDU in a 2.4 GHz band, initiate an SR transmission of up to 20 MHz bandwidth when SR conditions of OA-CCA on each 20 MHz are met.

For an 80 MHz received inter-BSS HE Trigger-based PPDU, initiate an SR transmission of up to 80 MHz bandwidth when SR conditions of OA-CCA on each 20 MHz are met.

For a 160 MHz received inter-BSS HE Trigger-based PPDU, initiate an SR transmission of up to 160 MHz bandwidth when SR conditions of OA-CCA on each 40 MHz are met.

For an 80+80 MHz received inter-BSS HE Trigger-based PPDU, initiate an SR transmission of up to 80 MHz bandwidth when SR conditions of OA-CCA on each 40 MHz are met.

FIG. 31 illustrates SR field values of a Trigger frame according to another embodiment. In the embodiment, constraints are placed on the values set for the fields 1, 2, 3, and 4 in the Trigger frame when an operational bandwidth is 40 MHz in a 2.4 GHz band or an operational bandwidth is 80+80 MHz.

In Trigger-based PPDU transmitted in response to the Trigger frame, an HE-SIG-A field includes first, second, third, and fourth 4-bit SR fields (totaling 16 bits) having values copied from corresponding SR fields 1, 2, 3, and 4, respectively, in the Trigger frame. The values of the first, second, third, and fourth SR fields in the Trigger frame indicate the conditions under which SR transmissions are allowed on respective 20 MHz or 40 MHz channels.

The 4-bit SR fields in Trigger frame are determined as indicated below:

For a 20 MHz operational bandwidth, SR field 1 includes an SRP value for the 20 MHz bandwidth, and the other three SR fields indicate values identical to the SR field 1.

For a 40 MHz operational bandwidth not in a 2.4 GHz band, SR fields 1 and 2 include respective SRP values for first and second 20 MHz bandwidths, and SR fields 3 and 4 include values identical to the first and second SR fields, respectively.

For a 40 MHz operational bandwidth in the 2.4 GHz band, the SR field 1 has a conservative value appropriate for both the first and second 20 MHz bandwidths (i.e., a minimum of an SRP value for the first 20 MHz bandwidth (SRP1) and an SRP value for the second 20 MHz bandwidth (SRP2)), and SR fields 2, 3, and 4 indicate values identical to the value of the SR field 1.

For an 80 MHz operational bandwidth, SR fields 1, 2, 3, and 4 include respective SRP values for first, second, third, and fourth 20 MHz bandwidths.

For a 160 MHz operational bandwidth, SR fields 1, 2, 3, and 4 include respective SRP values for first, second, third, and fourth 40 MHz bandwidths.

For an 80+80 MHz operational bandwidth, SR field 1 includes a conservative value appropriate for both the first and third 40 MHz bandwidths (i.e., a minimum of an SRP value for the first 40 MHz bandwidth (SRP1) and an SRP value for the third 40 MHz bandwidth (SRP3)). SR field 2 includes a conservative value appropriate for both the second and fourth 40 MHz bandwidths (i.e., a minimum of an SRP value for the second 40 MHz bandwidth (SRP2) and an SRP value for the fourth 40 MHz bandwidth (SRP4)). SR field 3 includes a same value as the value of SR field 1, and SR field 4 includes a same value as the value of SR field 2.

In this embodiment, in the example of FIG. 29 wherein the BW information indicating 40 MHz, a device can use any values among the multiple SR fields for any of 20 MHz values because the four SR fields indicate identical values. The device doesn't need frequency location information for the SR fields.

In this embodiment, in the example of FIG. 30 with bandwidth information indicating 80+80 MHz, the device can use, either the values in SR field 1 and SR field 2 or the values in SR field 3 and SR field 4, because SR fields 1 and 3 indicate identical values and SR field 3 and 4 indicate identical values. The device doesn't need frequency location information for the SR fields.

As shown in FIGS. 29 and 30, even though a device does not have any frequency location information on which SR fields are located on which 20 MHz or 40 MHz channels, the embodiment allows that after receiving the SR fields in an HE-SIG-A field of a received inter-BSS HE Trigger-based PPDU, the device may:

For a 20 MHz received inter-BSS HE Trigger-based PPDU, initiate an SR transmission of up to 20 MHz bandwidth when SR conditions of OA-CCA on each 20 MHz are met.

For a 40 MHz received inter-BSS HE Trigger-based PPDU, initiate an SR transmission of up to 20 MHz bandwidth when SR conditions of OA-CCA on each 20 MHz are met.

For an 80 MHz received inter-BSS HE Trigger-based PPDU, initiate an SR transmission of up to 80 MHz bandwidth when SR conditions of OA-CCA on each 20 MHz are met.

For a 160 MHz received inter-BSS HE Trigger-based PPDU, initiate an SR transmission of up to 160 MHz bandwidth when SR conditions of OA-CCA on each 40 MHz are met.

For an 80+80 MHz received inter-BSS HE Trigger-based PPDU, initiate an SR transmission of up to 80 MHz bandwidth when SR conditions of OA-CCA on each 40 MHz are met.

In an embodiment, the Trigger frame includes a 1 bit indication that differentiates between the 160 MHz and the 80+80 MHz cases.

In another embodiment, and HE-SIG-A contains multiple 4-bit SR fields and an optional channel information field which corresponds to a channel location, totaling 16 bits. The SR fields indicates conditions under which SR transmission is allowed on respective 20 MHz or 40 MHz channels. The channel information field indicates a frequency location.

FIG. 32 shows the SR fields and the optional channel information field of the HE-SIG-A field for transmissions in a 2.4 GHz band, according to an embodiment. For a 20 MHz operational bandwidth, a first SR field (SR field 1) indicates an SRP value for the 20 MHz bandwidth, and the other three SR fields (SR field 2, 3, and 4) indicate values identical to the first SR field. For a 40 MHz operational bandwidth, SR fields 1 and 2 include respective SRP values for first and second 20 MHz bandwidths, and the bits that would otherwise convey the SR fields 3 and 4 instead convey a channel information field. The channel information field indicates a frequency location of a bandwidth corresponding to the SR field 1 or the SR field 2. In an embodiment, the size of the channel number field is eight bits.

FIG. 33 illustrates another embodiment, in which an HE-SIG-A field includes multiple 4-bit SR fields and, for an 80+80 MHz operational bandwidth, a channel information field corresponding to a channel location.

The SR fields indicates the condition on whether SR transmission is allowed on respective 20 MHz or 40 MHz channels. The channel information field indicates a frequency location. The 4-bit SR fields and the channel information field are determined as indicated below:

For a 20 MHz operational bandwidth, SR field 1 includes an SRP value for the 20 MHz bandwidth, and the other three SR fields indicate values identical to the first SR field.

For a 40 MHz operational bandwidth, SR fields 1 and 2 include respective SRP values for first and second 20 MHz bandwidths, and SR fields 3 and 4 include values identical to the first and second SR fields, respectively.

For an 80 MHz operational bandwidth, SR fields 1, 2, 3, and 4 include respective SRP values for first, second, third, and fourth 20 MHz bandwidths.

For a 160 MHz operational bandwidth, SR fields 1, 2, 3, and 4 include respective SRP values for first, second, third, and fourth 40 MHz bandwidths.

For an 80+80 MHz operational bandwidth, SR field 1 includes an SRP value appropriate for both the first and third 40 MHz bandwidths. SR field 2 includes an SRP value appropriate for both the second and fourth 40 MHz bandwidths. That is, the SRP values provided in SR fields 1 and 2 for a primary 80 MHz bandwidth are repeated for a secondary 80 MHz bandwidth. The channel information field, which occupies bits that would otherwise be occupied by SR fields 3 and 4, indicates a frequency location of an 80 MHz bandwidth which doesn't include the Primary 20 MHz channel. In an embodiment, the frequency location is indicated using a channel number. In an embodiment, the size of the channel information field is eight bits.

In an embodiment, the HE-SIG-A field includes a one bit indication that differentiates between the 160 MHz and the 80+80 MHz operational bandwidths.

Considering the limited room available in the HE-SAG-A field to add frequency location to indicate channel location (which may require 8 bits) in addition to multiple N-bit SR information fields, for 80+80 MHz the secondary 80 MHz location may not be clear. One of the 4-bit SR field could be used to provide SRP for the secondary 80 MHz for SR transmissions.

FIG. 34 illustrates another embodiment, in which an HE-SIG-A field includes multiple 4-bit SR fields (total 16 bits) wherein the SR field indicates the condition on whether SR transmission is allowed on each 20 MHz or 40 MHz channel.

The SR fields indicates the condition on whether SR transmission is allowed on respective 20 MHz or 40 MHz channels. The channel information field indicates a frequency location. The 4-bit SR fields and the channel information field are determined as indicated below:

For a 20 MHz operational bandwidth, SR field 1 includes an SRP value for the 20 MHz bandwidth, and SR fields 1, 2, and 3 indicate values identical to the SR field 1.

For a 40 MHz operational bandwidth, SR fields 1 and 2 include respective SRP values for first and second 20 MHz bandwidths, and SR fields 3 and 4 include values identical to the SR fields 1 and 2, respectively.

For an 80 MHz operational bandwidth, SR fields 1, 2, 3, and 4 include respective SRP values for first, second, third, and fourth 20 MHz bandwidths.

For a 160 MHz operational bandwidth, SR fields 1, 2, 3, and 4 include respective SRP values for first, second, third, and fourth 40 MHz bandwidths.

For an 80+80 MHz operational bandwidth, SR field 1 includes an SRP value appropriate for all of the first to fourth 40 MHz bandwidths, and SR fields 1, 2, and 3 indicate values identical to the SR field 1. The value of the SR field 1 is a most conservative value among SR values appropriate for the first to fourth 40 MHz bandwidths.

In an embodiment, the HE-SIG-A field includes a one bit indication that differentiates between the 160 MHz and the 80+80 MHz operational bandwidths.

FIG. 35 illustrates another embodiment, in which an HE-SIG-A field includes multiple 4-bit SR fields (totaling 16 bits) wherein the SR field indicates the condition on whether SR transmission is allowed on each 20 MHz or 40 MHz channel. The 4-bit SR fields are determined as indicated below:

For a 20 MHz operational bandwidth, SR field 1 includes an SRP value for the 20 MHz bandwidth, and SR fields 1, 2, and 3 indicate values identical to the SR field 1.

For a 40 MHz operational bandwidth, SR fields 1 and 2 include respective SRP values for first and second 20 MHz bandwidths, and SR fields 3 and 4 include values identical to the SR fields 1 and 2, respectively.

For an 80 MHz operational bandwidth, SR fields 1, 2, 3, and 4 include respective SRP values for first, second, third, and fourth 20 MHz bandwidths.

For a 160 MHz operational bandwidth, SR fields 1, 2, 3, and 4 include respective SRP values for first, second, third, and fourth 40 MHz bandwidths.

For an 80+80 MHz operational bandwidth, SR field 1 includes an SRP value for both the first and third 40 MHz bandwidths. SR field 2 includes an SRP value for both the second and fourth 40 MHz bandwidths. SR fields 3 and 4 include values identical to the values of SR fields 1 and 2, respectively.

The HE-SIG-A field further includes a one bit indication that differentiates between the 160 MHz and the 80+80 MHz operational bandwidths.

When channels are assigned according to IEEE Std 802.11ac, only restricted contiguous channel utilizations are allowed, except for 80+80 MHz bandwidths. A primary 20 MHz bandwidth, may be located in any 20 MHz channel. Once the channel for the primary 20 MHz bandwidth is chosen, the channels used by a secondary 20 MHz bandwidth, a secondary 40 MHz bandwidth, and a secondary 80 MHz bandwidth, if present, are determined entirely by the location of the primary 20 MHz bandwidth.

Considering UL OFDMA transmissions in an HE WLAN in addition to coexistence with legacy BSSs supporting narrower bands, the non-contiguous channel bonding allows data transmission of HE stations on assigned non-contiguous channels which increase the system efficiency. But allowing every combination of available non-contiguous channels could be burden because it requires the large number of control information subfield (around 9 bits) in an HE-SIG field and increase the system complexity. It is reasonable to give some limitation to the non-contiguous channel bonding allocation.

FIG. 36 shows an example of an illustrative set of allowed channel bondings which includes the most useful cases which are most likely to occur. FIG. 36 includes examples of a discontinuous 60 MHz channel 3602, a discontinuous 40 MHz channel 3604, a discontinuous 140 MHz channel 3606, and a discontinuous 140 MHz channel 3608.

The discontinuous 60 MHz channel 3602 includes a primary 20 MHz bandwidth 3602A and a secondary 40 MHz bandwidth 3602B.

The discontinuous 40 MHz channel 3602 includes a primary 20 MHz bandwidth 3602A and a right half of a secondary 40 MHz (S40R) bandwidth 3602B. Information regarding the primary 20 MHz bandwidth 3602A may be included in a first channel of an HE-SIG-B field, and information regarding the right half of a secondary 40 MHz bandwidth 3602B may be included in a second channel of the HE-SIG-B field.

The discontinuous 140 MHz channel 3602 includes a primary 20 MHz bandwidth 3606A, a secondary 40 MHz bandwidth 3606B, and a secondary 80 MHz bandwidth 3606C.

The discontinuous 140 MHz channel 3602 includes a primary 20 MHz bandwidth 3608A, a secondary 20 MHz bandwidth 3608B, and a secondary 80 MHz bandwidth 3608C.

Given a value in BW field indicating a non-contiguous channel with the first 80 MHz case of a discontinuous 60 MHz channel 3602, different 60 MHz channels could be virtually assigned depending on the position of the Primary 20 MHz channel, as shown in FIGS. 37A and 37B.

FIG. 37A shows an example of a discontinuous 60 MHz channel when a primary 20 MHz channel is assigned to a lower half of a 40 MHz frequency block. FIG. 37B shows an example of a discontinuous 60 MHz channel when a primary 20 MHz channel is assigned to as upper half of a 40 MHz frequency block.

There may be some ambiguity when it comes to the SR indication rule between multiple SR fields above and each 20 MHz of a non-contiguous channel. In addition, there may need to be a definition of which values to set in each of the SR field where the medium is BUSY on secondary 20 MHz channels. FIGS. 37A and 37B show the 20 MHz bandwidth being numbered sequentially for the SR fields, without numbering the unused bandwidths.

FIGS. 38A and 38B illustrate another embodiment. In the embodiment of FIGS. 38A and 38B, the 20 MHz bandwidth being numbered sequentially for the SR fields, starting with the lowest frequency bandwidth even if it not used by the discontinuous 60 MHz channel.

In the embodiment, an SR-field comprises multiple SR fields where a first SR field corresponds to a lowest 20 MHz or 40 MHz channel in a frequency domain depending on a channel bandwidth, wherein an i-th 4-bit SR field indicates a value of SR parameters for an i-th 20 MHz channel.

The first SR field (SR field 1) corresponds to the lowest 20 MHz for an 80 MHz channel bandwidth. The first SR field corresponds to the lowest 40 MHz for a 160 MHz or 80+80 MHz channel bandwidth.

When a medium of i-th 20 MHz channel is BUSY, the SR field of the i-th 20 MHz channel sets a value with reserved or SR-not-allowed.

FIG. 39 illustrates another embodiment, in which an HE-SIG-A field includes two frequency indications for primary and secondary 80 MHz bandwidths of an 80+80 MHz bandwidth. In a Trigger-based PPDU transmitted in response to a Trigger frame, an HE-SIG-A field includes multiple 4-bit SR fields (total 16 bits) and two channel information field which corresponds to frequency locations of channels. Values of the SR fields in HE-SIG-A are copied from values of SR fields in the Trigger frame, and indicate the condition under which SR transmissions are allowed on each 20 MHz or 40 MHz channel. The channel information field includes a frequency location.

The 4-bit SR fields are determined as indicated below:

For a 20 MHz operational bandwidth, SR field 1 includes an SRP value for the 20 MHz bandwidth, and SR fields 1, 2, and 3 indicate values identical to the SR field 1.

For a 40 MHz operational bandwidth, SR fields 1 and 2 include respective SRP values for first and second 20 MHz bandwidths, and SR fields 3 and 4 include values identical to the SR fields 1 and 2, respectively.

For an 80 MHz operational bandwidth, SR fields 1, 2, 3, and 4 include respective SRP values for first, second, third, and fourth 20 MHz bandwidths.

For 160 MHz and 80+80 MHz operational bandwidths, SR fields 1, 2, 3, and 4 include respective SRP values for first, second, third, and fourth 40 MHz bandwidths.

The two channel information fields indicate first frequency locations of an i-th SR field and second frequency locations of a j-th SR field.

For a 20 MHz operational bandwidth, the first frequency location is of a first 20 MHz bandwidth indicated by the i-th SR field among the SR fields, and the second frequency location is of the first 20 MHz bandwidth indicated by the j-th SR field among the SR fields.

For a 40 MHz operational bandwidth, the first frequency location is of a first 20 MHz bandwidth indicated by the i-th SR field among the SR fields, and the second frequency location is of a second 20 MHz bandwidth indicated by the j-th SR field among the SR fields.

For an 80 MHz operational bandwidth, the first frequency location is of a first 20 MHz bandwidth indicated by the i-th SR field among the SR fields, and the second frequency location is of a second 20 MHz bandwidth indicated by the j-th SR field among the SR fields.

For 160 MHz and 80+80 MHz operational bandwidths, the first frequency location is of a first 40 MHz bandwidth indicated by the i-th SR field among the SR fields, and the second frequency location is of a second 40 MHz bandwidth indicated by the j-th SR field among the SR fields.

For 40, 80, 160, and 80+80 MHz operational bandwidth, the values of i and j are not same. The i-th SR field may correspond to the first, second, third, fourth 20 or 40 MHz bandwidth in a frequency domain. The j-th SR field may correspond to the first, second, third, fourth 20 or 40 MHz bandwidth in a frequency domain.

In an embodiment, the first and second frequency locations could be indicated by respective channel numbers.

In an embodiment, the first and second frequency locations could be indicated by an index (or order) of a 20 MHz channel list supported in the regulatory domain or an index (or order) of an 80 MHz channel list supported in the regulatory domain.

In respective embodiments, a size of each frequency location field could be 2, 3, or 4 bits.

For 160 MHz and 80+80 MHz, the two channel information fields shall respectively indicate a first frequency location of a first 80 MHz segment and a second frequency location of a second 80 MHz segment. For 40 MHz, the two channel information fields shall respectively indicate a first frequency location of a first 20 MHz segment and a second frequency location of a second 20 MHz segment.

After determining values of SR fields in an HE-SIG-A field of a received inter-BSS HE Trigger-based PPDU, a device may:

For a 20 MHz received inter-BSS HE Trigger-based PPDU, initiate an SR transmission of up to 20 MHz bandwidth when SR conditions of OA-CCA on the 20 MHz are met.

For a 40 MHz received inter-BSS HE Trigger-based PPDU, initiate an SR transmission of up to 40 MHz bandwidth when SR conditions of OA-CCA on each 20 MHz are met.

For an 80 MHz received inter-BSS HE Trigger-based PPDU, initiate an SR transmission of up to 80 MHz bandwidth when SR conditions of OA-CCA on each 20 MHz are met.

For a 160 MHz or 80+80 MHz received inter-BSS HE Trigger-based PPDU, initiate an SR transmission of up to 160 MHz bandwidth when SR conditions of OA-CCA on each 40 MHz are met.

As shown in FIG. 40, 80 MHz channelization of a 5 GHz band are defined in the United State wherein channel center frequency indices are 42, 58, 106, 122, 138 and 155. In other countries, such as Japan and countries in Europe, 80 MHz channelization of a 5 GHz band are have channel center frequency indices of 42, 58, 106 and 122.

In an embodiment, values of the Frequency Location fields corresponds to the channel center frequency index of 80 MHz channels. For example, for an 80+80 MHz operational bandwidth, when a value of 0 is assigned to a Frequency Location field corresponding to a first 40 MHz bandwidth, the 80 MHz channelization whose channel center frequency index is 42 is assigned for first and second 40 MHz channels of the 80+80 MHz operational bandwidth.

In an embodiment, the value in Frequency Location corresponds to the numbering of enumerated 80 MHz from lowest frequency as an example in FIG. 41. For example, for an 80+80 MHz operational bandwidth when value is set to 0 in the Frequency Location field of a first 40 MHz bandwidth, an 80 MHz channelization having a lowest frequency is assigned first and second 40 MHz channels of the 80+80 MHz operational bandwidth.

FIG. 42 illustrates a process 4200 for determining SR fields of a Trigger frame, according to an embodiment. In an embodiment, the process 4200 is performed by an AP of an HE WLAN.

At S4202, the process 4200 determines an operating bandwidth. The operating bandwidth may be an operating bandwidth of a PPDU transmitted in response to the Trigger frame.

At S4204, the process 4200 determines whether the operating bandwidth is a 40 MHz bandwidth. The process 4200 proceeds to S4230 when the operating bandwidth is the 40 MHz bandwidth, and otherwise proceeds to S4206.

At S4206, the process 4200 determines whether the operating bandwidth is an 80+80 MHz bandwidth. The process 4200 proceeds to S4210 when the operating bandwidth is the 80+80 MHz bandwidth, and otherwise proceeds to S4208.

At S4208, the process 4200 determines values in the SR fields of the trigger frame according to whether the operating bandwidth is 20, 80, or 160 MHz. The process 4200 then ends.

At S4210, the process 4200 determines a value in a first SR parameter SRP1 for a primary 40 MHz bandwidth of the operating bandwidth.

At S4212, the process 4200 determines a value in a second SR parameter SRP2 for a secondary 40 MHz bandwidth of the operating bandwidth.

At S4214, the process 4200 determines a value in a third SR parameter SRP3 for a first 40 MHz bandwidth of a secondary 80 MHz bandwidth of the operating bandwidth.

At S4216, the process 4200 determines a value in a fourth SR parameter SRP4 for a second 40 MHz bandwidth of a secondary 80 MHz bandwidth of the operating bandwidth.

At S4218, the process 4200 determines a first conservative SR parameter Min_SRP1 by calculating a minimum of the value of the first SR parameter SRP1 and the value of the third SR parameter SRP3.

At S4220, the process 4200 determines a second conservative SR parameter Min_SRP2 by calculating a minimum of the value of the second SR parameter SRP2 and the value of the fourth SR parameter SRP4.

At S4222, and as illustrated in the "For 80+80 MHz" example of FIG. 31, the process 4200 sets each of a first SR field of a frame (SR field 1) and a third SR field of the frame (SR field 3) according to the value of the first conservative SR parameter Min_SRP1, and sets each of a second SR field of a frame (SR field 2) and a fourth SR field of the frame (SR field 4) according to the value of the second conservative SR parameter Min_SRP2. The process 4200 then ends.

At S4230, the process 4200 determines a value in a first SR parameter SRP1 for a primary 20 MHz bandwidth of the operating bandwidth.

At S4232, the process 4200 determines a value in a second SR parameter SRP2 for a secondary 20 MHz bandwidth of the operating bandwidth.

At S4234, the process 4200 determines whether the operating bandwidth is in a 2.4 GHz band. The process 4200 proceeds to S4238 when the operating bandwidth is in the 2.4 GHz band, and otherwise proceeds to S4236.

At S4236, the process 4200 sets each of a first SR field of a frame and a third SR field of the frame according to the value of the first SR parameter SRP1, and sets each of a second SR field of a frame and a fourth SR field of the frame according to the value of the second SR parameter SRP2. The process 4200 then ends.

At S4238, the process 4200 determines a conservative SR parameter Min_SRP by calculating a minimum of the value of the first SR parameter SRP1 and the value of the second SR parameter SRP2.

At S4240, and as illustrated in the "For 40 MHz (2.4 GHz only)" example of FIG. 31, the process 4200 sets each of the first, second, third, and fourth SR fields of the frame according to the value of the conservative SR parameter Min_SRP. The process 4200 then ends.

After the process 4200 ends, the AP performed the process 4200 may transmit the frame including the first to fourth SR fields.

Embodiments enable additional opportunities for Spatial Reuse (SR) transmissions in OBSS regions, thereby increasing system efficiency of an HE WLAN.

The solutions provided herein have been described with reference to a wireless LAN system; however, it should be understood that these solutions are also applicable to other network environments, such as cellular telecommunication networks, wired networks, etc.

The above explanation and figures are applied to an HE station, an HE frame, an HE PPDU, an HE-SIG field and the like of the IEEE 802.11ax amendment, but they can also applied to a receiver, a frame, PPDU, a SIG field, and the like of another future amendment of IEEE 802.11.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

In some cases, an embodiment of the invention may be an apparatus (e.g., an AP station, a non-AP station, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method performed by a first wireless device, the method comprising:
   determining, by the first wireless device, a bandwidth on which a frame will be transmitted to a second wireless device;
   determining, by the first wireless device, two or more Spatial Reuse (SR) parameter values for the bandwidth;
   setting, by the first wireless device using the two or more SR parameter values, a first SR field and a second SR field of the frame based on the bandwidth and a channel center frequency in which the bandwidth is carried; and
   transmitting the frame to the second wireless device on the bandwidth,
   wherein the first and second SR fields indicate respective properties other than the bandwidth and the channel center frequency in which the bandwidth is carried.

2. The method of claim 1, further comprising:
   setting the first SR field and the second SR field to a first SR value when the bandwidth is a 40 MHz bandwidth and the channel center frequency is in a 2.4 GHz band.

3. The method of claim 2, further comprising:
   setting a third SR field of the frame to the first SR value; and
   setting a fourth SR field of the frame to the first SR value when the bandwidth is the 40 MHz bandwidth and the channel center frequency is in the 2.4 GHz band.

4. The method of claim 2, further comprising when the bandwidth is the 40 MHz bandwidth and the channel center frequency is in the 2.4 GHz band:

determining a first SR parameter value for a first 20 MHz bandwidth in the bandwidth;

determining a second SR parameter value for a second 20 MHz bandwidth in the bandwidth; and setting the first SR value to a minimum of the first SR parameter value and the second SR parameter value when the bandwidth is the 40 MHz bandwidth and the channel center frequency is in the 2.4 GHz band.

5. The method of claim 1, further comprising:

setting the first SR field to a first SR value when the bandwidth is an 80+80 MHz bandwidth and the channel center frequency is in a 5 GHz band; and setting the second SR field to a second SR value when the bandwidth is an 80+80 MHz bandwidth and the channel center frequency is in the 5 GHz band.

6. The method of claim 5, further comprising:

setting a third SR field of the frame to the first SR value when the bandwidth is the 80+80 MHz bandwidth and the channel center frequency is in the 5 GHz band; and setting a fourth SR field of the frame to the second SR value when the bandwidth is the 80+80 MHz bandwidth and the channel center frequency is in the 5 GHz band.

7. The method of claim 6, further comprising when the bandwidth is the 80+80 MHz bandwidth and the channel center frequency is 5 GHz:

determining a first SR parameter value, in the two or more SR parameter values, for a first 40 MHz bandwidth of the bandwidth;

determining a second SR parameter value, in the two or more SR parameter values, for a second 40 MHz bandwidth of the bandwidth;

determining a third SR parameter value, in the two or more SR parameter values, for a third 40 MHz bandwidth of the bandwidth;

determining a fourth SR parameter value, in the two or more SR parameter values, for a fourth 40 MHz bandwidth of the bandwidth;

setting the first SR value to a minimum of the first SR parameter value and the third SR parameter value when the bandwidth is the 80+80 MHz bandwidth and the channel center frequency is in the 5 GHz band; and setting the second SR value to a minimum of the second SR parameter value and the fourth SR parameter value when the bandwidth is the 80+80 MHz bandwidth and the channel center frequency is in the 5 GHz band.

8. The method of claim 1, wherein the first SR field has a length of four bits and the second SR field has a length of four bits.

9. A method performed by a wireless device, the method comprising:

determining, by the wireless device, an operational bandwidth of a frame to be transmitted;

determining, by the wireless device, a plurality of Spatial Reuse (SR) parameter values for the operational bandwidth;

setting, by the wireless device using the plurality of SR parameters, first and second fields of the frame according to the operational bandwidth and a channel center frequency, the first and second fields each including information for use in a Spatial Reuse (SR) operation; and transmitting the frame using the channel center frequency and the operational bandwidth, wherein the first and second fields indicate respective properties other than the operational bandwidth and the channel center frequency.

10. The method of claim 9, further comprising:

setting the first field and the second field to a first value when the operational bandwidth is a 40 MHz bandwidth and the channel center frequency is in a 2.4 GHz band.

11. The method of claim 10, further comprising:

setting a third field of the frame to the first value, the third field including information for use in the SR operation; and setting a fourth field of the frame to the first value when the bandwidth is a 40 MHz bandwidth and the channel center frequency is in the 2.4 GHz band, the fourth field including information for use in the SR operation.

12. The method of claim 10, further comprising:

determining a first SR parameter value of the plurality of SR parameter values for a first 20 MHz bandwidth of the operational bandwidth;

determining a second SR parameter value of the plurality of SR parameter values for a second 20 MHz bandwidth of the operational bandwidth; and setting the first value to a minimum of the first SR parameter value and the second SR parameter value when the bandwidth is the 40 MHz bandwidth and the channel center frequency is in the 2.4 GHz band.

13. The method of claim 9, further comprising:

setting the first field to a first value when the bandwidth is an 80+80 MHz bandwidth and the channel center frequency is in a 5 GHz band; and setting the second field to a second value when the bandwidth is the 80+80 MHz bandwidth and the channel center frequency is in the 5 GHz band.

14. The method of claim 13, further comprising:

setting a third field of the frame to the first value; and setting a fourth field of the frame to the second value when the bandwidth is the 80+80 MHz bandwidth and the channel center frequency is in the 5 GHz band.

15. The method of claim 14, further comprising:

determining a first SR parameter value of the plurality of SR parameter values for a first 40 MHz bandwidth of the operational bandwidth;

determining a second SR parameter value of the plurality of SR parameter values for a second 40 MHz bandwidth of the operational bandwidth;

determining a third SR parameter value of the plurality of SR parameter values for a third 40 MHz bandwidth of the operational bandwidth;

determining a fourth SR parameter value of the plurality of SR parameter values for a fourth 40 MHz bandwidth of the operational bandwidth;

setting the first value to a minimum of the first SR parameter and the third SR parameter when the bandwidth is the 80+80 MHz bandwidth and the channel center frequency is in the 5 GHz band; and setting the second value to a minimum of the second SR parameter and the fourth SR parameter when the bandwidth is the 80+80 MHz bandwidth and the channel center frequency is in the 5 GHz band.

16. The method of claim 9, wherein the first field has a length of four bits and the second field has a length of four bits.

17. The method of claim 9, wherein the first field corresponds to a signal power and the second field corresponds to a signal power.

18. A first wireless device, comprising:
one or more processors; and
a transmitter circuit,
wherein the first wireless device is to:
- determine, using the one or more processors, a bandwidth on which a frame will be transmitted to a second wireless device;
- calculate, using the one or more processors, two or more Spatial Reuse (SR) parameter values for the bandwidth;
- set, using the one or more processors and the two or more SR parameter values, a first SR field and a second SR field of the frame based on the bandwidth and a channel center frequency on which the bandwidth is carried; and
- transmit, using the transmitter circuit, the frame to the second wireless device on the bandwidth, wherein the first and second SR fields indicate respective properties other than the bandwidth and the channel center frequency on which the bandwidth is carried.

* * * * *